United States Patent [19]
Zalewski

[11] Patent Number: 5,991,693
[45] Date of Patent: Nov. 23, 1999

[54] WIRELESS I/O APPARATUS AND METHOD OF COMPUTER-ASSISTED INSTRUCTION

[75] Inventor: Gary Michael Zalewski, San Francisco, Calif.

[73] Assignee: Mindcraft Technologies, Inc., San Francisco, Calif.

[21] Appl. No.: 08/606,347

[22] Filed: Feb. 23, 1996

[51] Int. Cl.$^6$ .................................................... G09B 7/00
[52] U.S. Cl. ......................... 701/300; 345/156; 434/118; 434/169; 434/327; 434/335
[58] Field of Search ........................... 701/300; 345/156, 345/158, 326; 434/118, 159, 167, 169, 172, 176, 322, 327, 333, 335, 337, 351

[56] References Cited

U.S. PATENT DOCUMENTS

| | | | |
|---|---|---|---|
| 4,342,904 | 8/1982 | Onsager | 235/493 |
| 5,072,414 | 12/1991 | Buisker et al. | 702/103 |
| 5,119,077 | 6/1992 | Giorgio | 345/163 |
| 5,146,566 | 9/1992 | Hollis, Jr. et al. | 395/893 |
| 5,183,398 | 2/1993 | Monte et al. | 434/227 |
| 5,228,859 | 7/1993 | Rowe | 434/118 |
| 5,396,265 | 3/1995 | Ulrich et al. | 345/156 |

*Primary Examiner*—William A. Cuchlinski, Jr.
*Assistant Examiner*—Ed Pipala

[57] ABSTRACT

A remote computer I/O apparatus comprising of a set of position tracked wireless user manipulated bodies and a host adapter station. Input is derived from the real-time position tracking telemetry received from each user manipulated body over a wireless transmitter housed in each body. Location determination is performed on a relative clustering basis using photonic light pulses, on a relative absolute special positioning basis using ultrasonic triangulation between bodies, or on a relative absolute spatial positioning basis between each body and the host adapter. For output each body may store or receive video and audio generated respectively by the controlled computer or by an sound generating device such as a soundcard running on the same. Stored feedback is emitted from each body upon receipt of playback signals transmitted to any selected bodies causing them to display stored video on a local body display or to emit stored audio segments out a local body speaker. Non-stored feedback is wireless broadcast to selected bodies for output through each body display or speaker. All feedback may be segmented into frames and distributed to targeted select bodies to enable direct feedback response. A model for using the interface in a direct feedback training environment is also provided.

91 Claims, 27 Drawing Sheets

FIG. 3
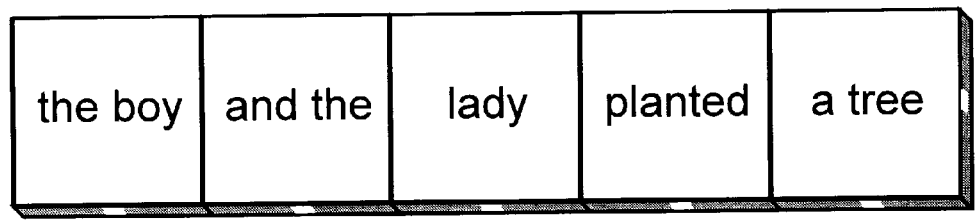
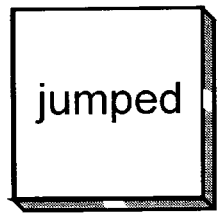
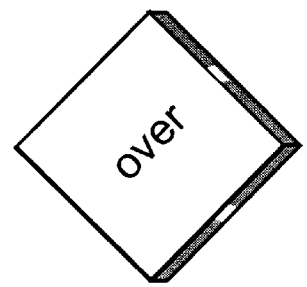
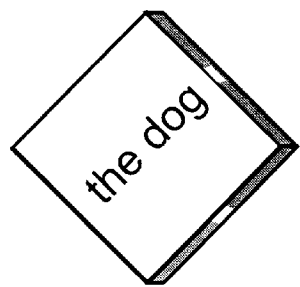

FIG. 4

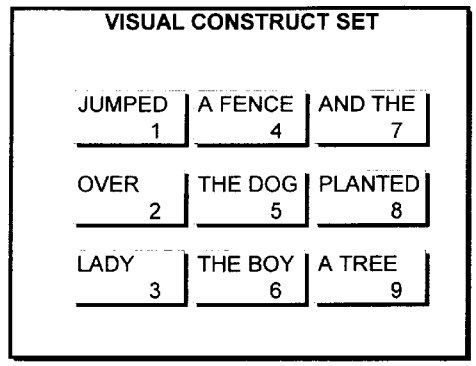

FIG. 5

| LESSONS |
|---|
| THE BOY JUMPED OVER A FENCE |
| THE BOY JUMPED OVER THE DOG |
| THE BOY PLANTED A TREE |
| THE BOY AND THE LADY PLANTED A TREE |
| THE BOY AND THE LADY JUMPED OVER A FENCE |
| THE BOY AND THE LADY JUMPED OVER A TREE |
| THE BOY AND THE LADY JUMPED OVER THE DOG |
| THE DOG JUMPED OVER A FENCE |
| OVER A FENCE JUMPED THE BOY |
| OVER A FENCE JUMPED THE DOG |
| OVER A FENCE JUMPED THE BOY AND THE LADY |
| {OTHERS} |

FIG. 6

| LESSON RULES |
|---|
| 6,1,2,4 |
| 6,1,2,5 |
| 6,8,9 |
| 6,7,3,8,9 |
| 6,7,3,1,2,4 |
| 6,7,3,1,2,9 |
| 7,7,3,1,2,5 |
| 5,1,2,4 |
| 2,4,1,6 |
| 2,4,1,6,7 |
| 2,4,1,6 |

| FRAME | BODY# 1 | 2 | 3 | 4 | 5 | 6 | 7 | 8 | 9 |
|---|---|---|---|---|---|---|---|---|---|
| 0 | 0 | 0 | 0 | 0 | 0 | 1 | 0 | 0 | 0 |
| 628 | 0 | 0 | 0 | 0 | 0 | 0 | 1 | 0 | 0 |
| 867 | 0 | 0 | 1 | 0 | 0 | 0 | 0 | 0 | 0 |
| 1446 | 0 | 0 | 0 | 0 | 0 | 0 | 0 | 1 | 0 |
| 2020 | 0 | 0 | 0 | 0 | 0 | 0 | 0 | 0 | 1 |
| 2703 | 0 | 0 | 0 | 0 | 0 | 0 | 0 | 0 | 0 |

*FIG. 10A - HEADER DATA PACKET*
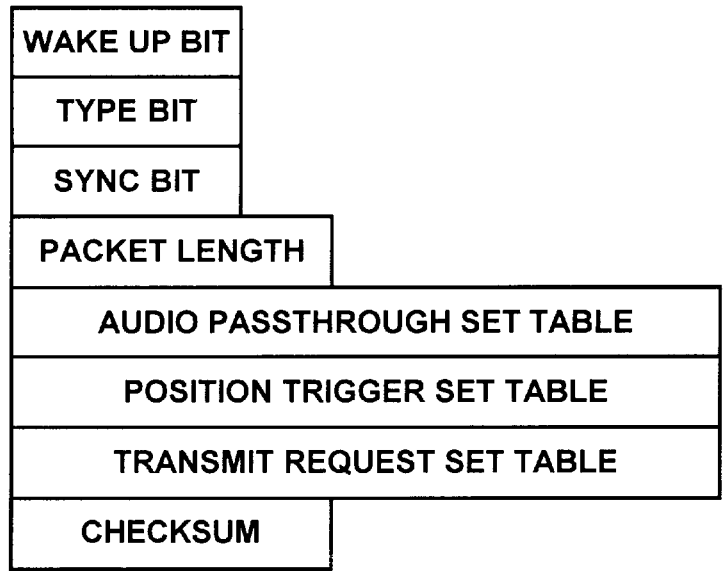
*FIG. 10B - DISPLAY DATA PACKET*
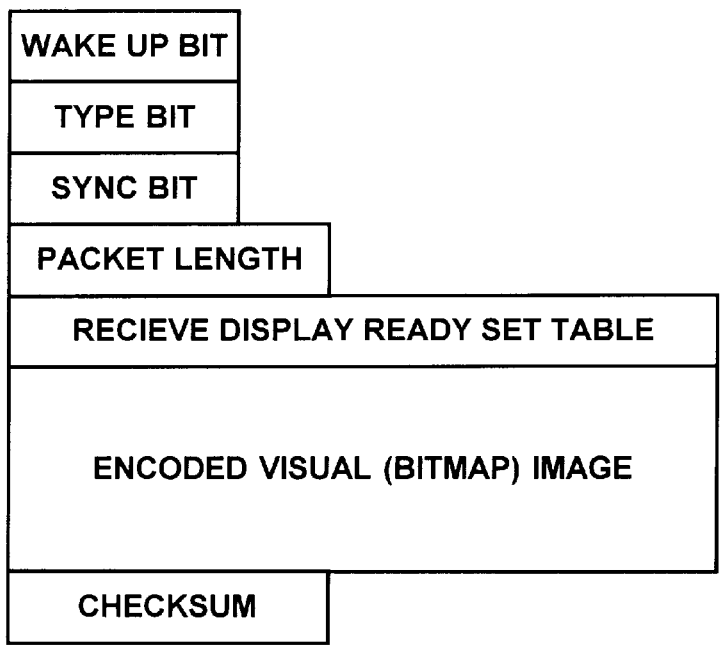

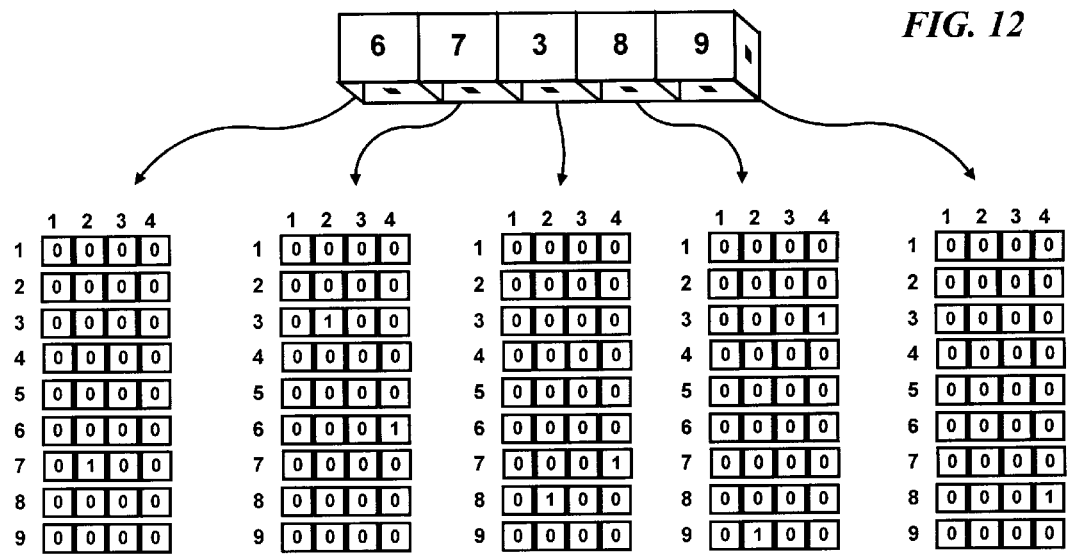
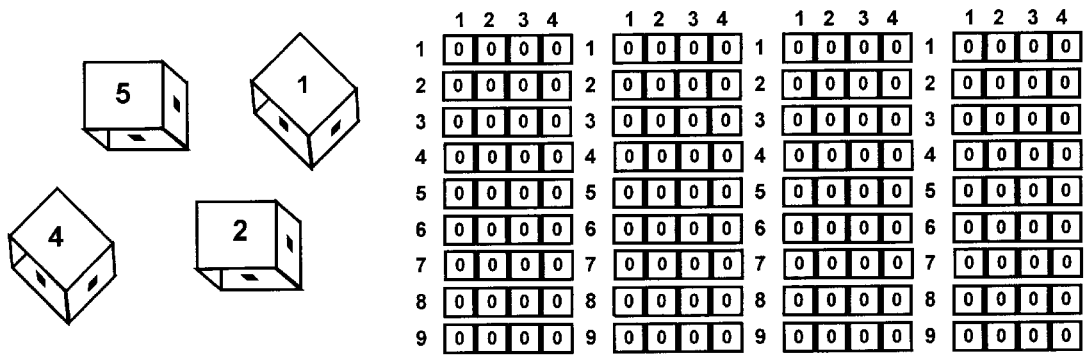
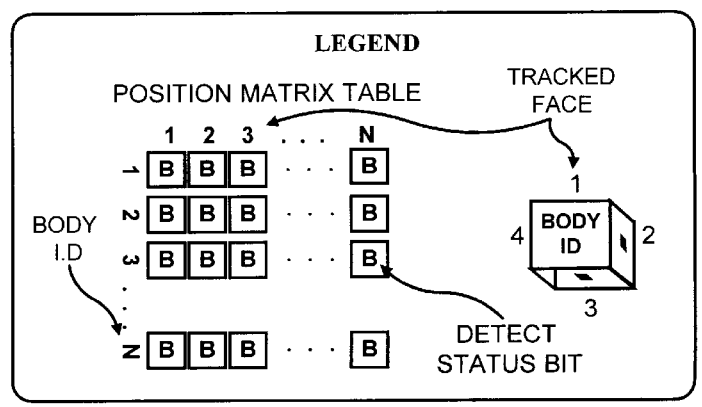
*FIG. 12*

FIG. 27
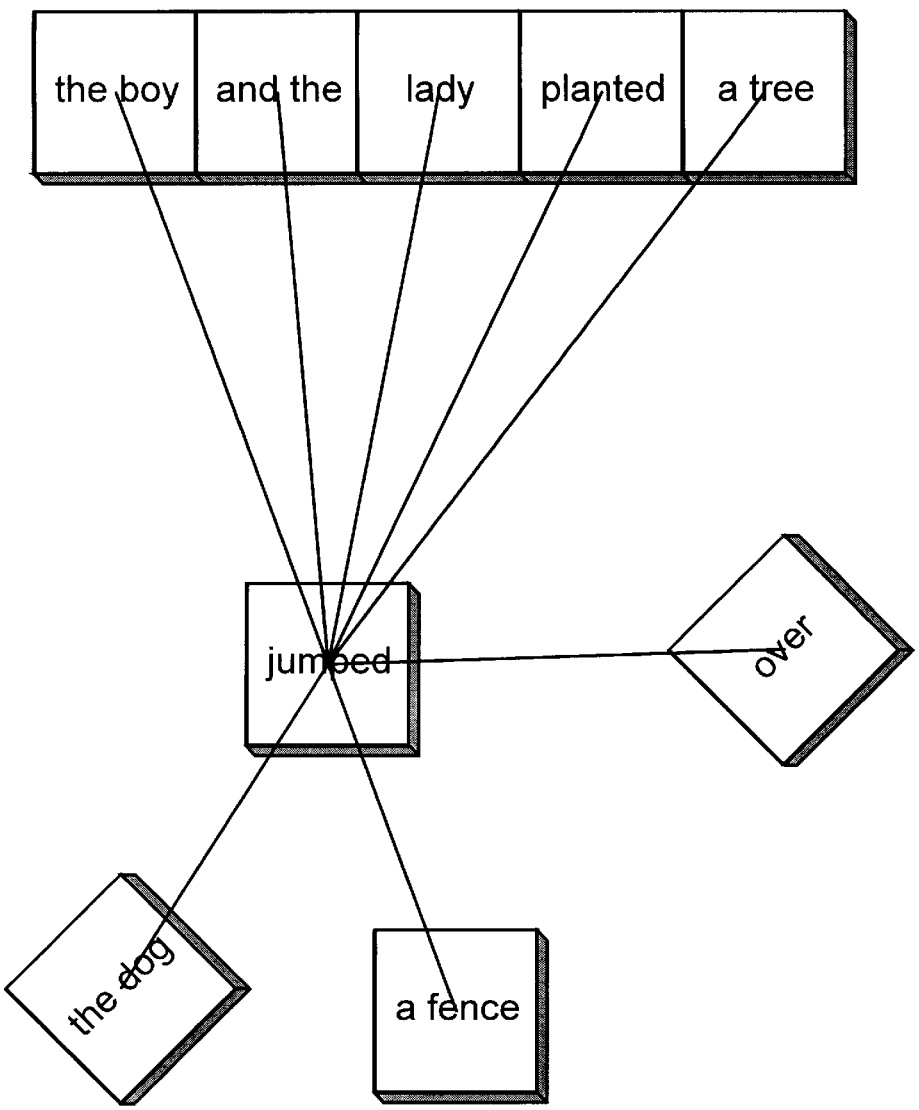
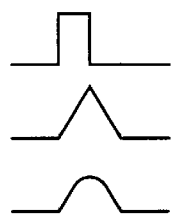
FIG. 27a
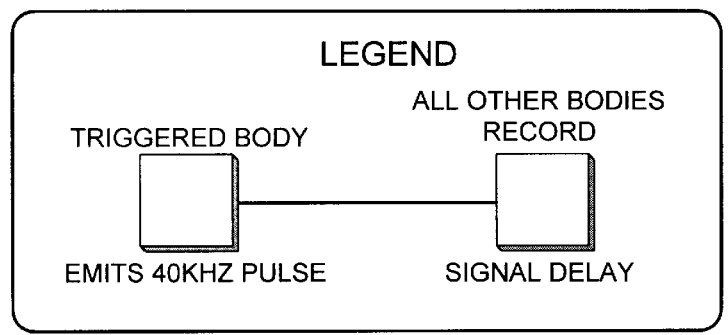

WIRELESS I/O APPARATUS AND METHOD OF COMPUTER-ASSISTED INSTRUCTION

FIELD OF INVENTION

This invention relates to human-computer interfacing, specifically to a practical and universal method and apparatus enabling enhanced computerized interaction and instruction through a set of interactive, trackable, autonomous, independent, hand-movable, and wireless bodies each of which may contain a screen and speaker enabling each body to display graphics and emit sounds received from a training system via a wireless transmission device connected to a personal computer running training software.

BACKGROUND OF THE INVENTION

Computer systems designed to supplement learning have exploded into schools and are touted as having the capability to revolutionize the learning process. Computer aided instruction has equally become indoctrinated into nearly every home exposing students to topics ranging from basic reading to advanced calculus. The computer can patiently and persistently teach at the student's pace and it can be made available whenever the student is eager to study. Computer aided teaching systems also can certainly make learning an exciting process, especially when considering the plurality of information-based media available today.

Despite the tremendous success of computer-aided teaching systems they are not capable of being embraced by students with limited cognitive and motor skills. This failure is caused by existing interface systems which stymie two way interaction between "developing" students (e.g. children, infants, the mentally challenged, etc.) and the underlying teaching application. Interfacing systems generally fail to provide a developing student the degree of output complex enough to enforce direct feedback while maintaining an input process simple enough to allow the student's usage. As such, these systems tend to distort the communication between the student and the training computer causing misinterpretation for both parties. Certainly, even the slightest misinterpretation of the student's response will cause the training software to provide incorrect reinforcement misleading, confusing, and discouraging the participating student.

Computer aided instruction systems employ as an input means a plurality of devices such as the keyboard, mouse, lightpen, joystick, trackball etc. These interface devices have proved to be very effective for adults and children who understand and are capable of using these devices without causing a bias in their response to stimuli. However, developing students generally do not foster the appropriate level of cognitive and motor sophistication to use existing input devices as each assume a level of skills required for their proper use. For example, a keyboard input device assumes that the user has an understanding of keys, how to press them, what they represent, how to enunciate their titles, etc. Developing students generally do not the alphabet or know how to spell or read and nonetheless lack sophisticated coordination skills allowing them to express any understanding or comprehension thereof Besides, the counter-intuitive sorting of characters on the QWERTY keyboard is confusing to the developing student while learning their ABC's. A mouse, joystick and trackball although more easily used, still assume that the user has a level of hand-eye coordination, concentration, and focus to successfully land the pointing device in some fixed target area while remembering to both press the trigger button and recollect the initial stimuli which invoked the response in the first place.

Existing computerized instruction systems generally employ a computer screen and a pair of speakers as the output means for conveying stimulus and reinforcement to their students. However, these appliances do not maintain a developing student's motivation during instruction sessions. Often, when using such devices, students become distracted by random events occurring in or around their environment and entirely lose focus on the underlying lesson. Educators suggest that a periodic change in a developing student's physical learning environment can replenish the student's lost energy and motivation during instruction. Unfortunately, moving these appliances into different learning environments is a profoundly burdensome task since existing screen and speaker output devices are generally too heavy and are usually captured in a tight jungle of cumbersome wiring.

In an effort to provide the output complexity required for maintaining the developing student's curiosity, certain applications project three dimensional visual and auditory stimuli through existing output devices such as the display and speaker system. However, because the display screen is planar and the paired speakers are fixed in space i.e. both are two dimensional, the projection of three dimensional effects through these output means is often found as an intuitive contradiction to the developing student since the desired visual impact cannot be perceived through the physical characteristics of the output devices themselves. For example, a developing student believes through touch experiments that the CRT screen is flat and not a three dimensional 'space' like its output might suggest. Also, a developing student may rightfully understand that sound must come from some physical device; simulating or projecting three dimensional audio from a fixed stereophonic pair of speakers may leave the student in bewilderment wondering where the sound originated from. As such, prior-art output devices generally distort and may even harm a developing student's spatial reasoning skills.

Besides said obstacles presented by the individual input and output devices while viewed independently, when used simultaneously in a training exercise these concerns become larger problems for a student with limited concentration who is forced to manage both disparate devices to communicate with the computer. The distinction between separate input and output devices adds tremendous complexity to the interactive process by requiring the student to pay attention to and concentrate on both fragmented devices during a learning session. To interact with the system for example a learning student must; observe and focus on the output means i.e. screen device or speaker . . . , absorb the learning stimulus . . . , develop a response thereto . . . , change mental and physical focus from the output means to the separate input device . . . , convey the mental response physically through the input device . . . , shift mental and physical focus back to the output means . . . , absorb the feedback . . . , recall the initial stimuli. . . . , recall the response taken . . . , comprehend the feedback . . . , before the event is digested as that of being a learned experience. A developing student is generally incapable of committing the range of effort required to manage this complex process. It typically results in frustration and sporadic physical behavior usually causing a series of input events which are interpreted by the training system as a response input. This can prompt inaccurate thus harmful feedback to the student.

Other devices such as touch sensitive display screens have attempted to bridge the input and output interface gap, but by themselves do not enable real kinetic moving or targeted audio feedback that developing students require for sustaining interaction. First, like the others they pose a danger for young children who are exposed to the underlying radiation of the CRT for extended periods of time. Second, they rely on presenting learning stimuli on a planar screen limiting the sophistication of delivery to a two dimensional canvas. Third, they are incapable of providing sufficient exercise of motor skills and coordination, since tactile sensory feedback is not provided during the interactive process.

In the latest attempt to provide a computer user with a simulated visual, audio, and kinesthetic environment in three dimensions, a user will typically wear a set of goggles containing liquid display flat-screens in front of each eye and a position sensor that measures the position and orientation of the head and one hand in three dimensions. As the user moves in three dimensions, computer generated images in the goggles are updated using position information to create the effective movement inside a "virtual" space. Spatial or targeted audio is generated in a set of headphones the user wears. This space may contain learning stimuli of interest to the user. The user may affect the virtual space utilizing, for example a tactile feedback "data glove" which may be worn on one hand. These systems are capable of providing an effective learning environment, but require that users are strong, agile, and generally capable of wearing the plurality of devices and attachments on the body without effecting their ability to interact and respond to the learning stimuli. However exciting, these virtual methodologies cannot be implemented on fragile youths without causing input distortion from the plurality of attachments on their body during a learning session.

In summary, the general immobile nature of existing output means, the complexity of input means, and the general disjoint between disparate input and output devices employed in existing interfacing systems do not promote effective, motivational, and non-harmful interaction between a developing student's physical experimental behavior and learning objectives of the underlying training system. Thus existing interfacing means generally can not accurately and effectively be used to teach even the simplest lessons to this type of student. As a result, the sophistication of developing student learning systems is limited to that of very simple linear drill exercises. Besides being harmful these exercises sharply contrast those which are available for students who have cognitively and physically embraced interfacing to the point where they may transparently interact with a training system without the interface means causing a bias in the interpretation of stimuli, response, or reinforcement.

SUMMARY OF THE INVENTION

It an object of the invention to provide an interface system which is universal, practical, and capable of being used on a wide array of computer platforms including, but not limited to those such as personal computers, personal home game machines, workstations, and platforms designed exclusively for use with the interface.

It is an object of the invention to provide an interface system which may be used for a plurality of purposes, including but not limited to supporting remote computer-aided learning activities, supporting remote simulation and entertainment activities, supporting remote behavioral research activities.

It is an object of the invention to provide an interface system which may leverage processing and storage power of the controlled computer and allows the user to remotely interact with the controlled computer in locations including, but not limited to a baby's crib, a bathtub, a kitchen table, a nursery school floor, a playground, a children's research environment, a neuralphychological research center, a traumatic-brain injury rehabilitation center, an animal behavioral research center.

It is an object of the present invention to provide a human-computer apparatus which may incorporate a simple intuitive input process and which can provide an unlimited amount of complex and non-harmful output to the user.

It is another object of the present invention to provide a human-computer interface which may include a self-contained local display which does not emit harmful CRT radiation.

It is also an object of the invention to provide a interface system which may provide an unlimited degree of three dimensional audio output for use including, but need not be limited to, providing positive and negative reinforcement through a plurality of sounds, speech of vowels, letters, words, numbers, sentences, sounds, etc.

It is also an object of the invention to provide a interface system which may provide an unlimited degree of video output in three dimensions for use including, but need not be limited to, providing positive and negative reinforcement through a plurality of graphics i.e. display of vowels, letters, words, sentences, etc.

It is an object of the invention to provide an interface system of which means of input and output may occur through non-divergent devices enabling greater student concentration resulting from interfacing simplicity.

It is another object of the invention to provide an interface which may enable the user to interact in a dynamic, three dimensional and kinesthetic manner with entities not containing wires or other items which may cause distraction and loss of concentration during interaction.

It is yet another object of the invention to provide an interface which may enable the user to interact in a dynamic, three dimensional and kinesthetic environment without requiring the user to wear attachments or other items which cause distraction and loss of concentration.

It is an object of the invention to provide an interface system which may promote rather than hinder the user's motor skills and general perception of three dimensional spatial relations.

It is another object of the invention to provide an interface system which may be used in conjunction with new or traditional toys and games including, but not limited to, those having movable pieces such as action figures and board games.

It is another object of the present invention to provide a method of computer-aided instruction encompassing; automated, complex, and directed feedback provided to the user in response to his prompted or natural curious experimentation with any user manipulated bodies.

GENERAL DESCRIPTION

The present invention control system "host adapter" apparatus provides control for managing wireless communications with one or more bodies remotely manipulated by the interfacing user. The host adapter can be connected to the controlled computer through a general i/o port and optionally to the output of a sound generation device such as a sound card running on the controlled computer. The device may broadcast audio/visual output of stimuli/feedback to each user manipulated body over a wireless communication link. As such audio from the controlled computer sound card may be modulated and transmitted to the bodies for storage or for real-time output through a gate-enabled speaker installed in each body. Similarly visual bitmap and other data may also be pulse transmitted over the same link for; providing images to a small active LED matrix or other display means which may be attached to each body, setting the enable or disable status of a body's speaker from emitting received broadcast audio, tasking a body to load or play indexed audio samples, and for enabling general remote control each body's control means. All audio and video feedback may be targeted to any body during any time frame and frame dispatch periodicity may occur at rates as high as 30 frames per second.

Such feedback may be broadcast from the host adapter in response to requests from training/interactive software running on the controlled computer. Feedback can be segmented into an unlimited variable number of frames with each frame targeted to one or more of the bodies in the control system. Audio targeting may be performed by abruptly prompting an indexed body to emit a stored-indexed sound sample and/or by engaging or disengaging any user manipulated body's speaker from receiving real-time broadcast audio from the optional connected soundcard. Video targeting may be performed by abruptly changing the display of any user manipulated body. All feedback may be transmitted to the bodies according to the stimulus or reinforcement objective of a teaching lesson. Lessons may prepared in advance and may comprise physical body arrangement rules, audio/visual feedback, and a feedback targeting strategy. All audio/visual output feedback associated with a lesson may reinforce the physical behavior of the student by associating the feedback stimuli to the arrangement constructed by the student.

For input, the control apparatus may incorporate the real-time position and orientation tracking of the bodies. Three unique methods of implementing the control apparatus tracking system have been identified resulting in three embodiments of the present invention. The first preferred embodiment uses photodetection to real-time track each body's relative adjacency to other user bodies configured in the control apparatus. Orientation may be determined via a hybrid mechanical/electrical sensor apparatus secured inside each body. The second and third embodiments are slight modifications of the first; the second preferred embodiment uses sonic triangulation of wave pulses between the bodies for real-time determination of absolute three dimensional position of each body. The third preferred embodiment uses wave pulse sonic triangulation between each user manipulated body and the host adapter to determine the real-time absolute three dimensional position of each body. All embodiments share a variety of configuration options including a microphone secondary input means which may be configured to a body for enabling user generated auditory input to be broadcast to the host adapter enabling the controlled computer to perform speech recognition and response thereto, upon receipt thereof.

DESCRIPTION OF FIGURES

FIG. 2B is a block diagram illustrating the present invention as employed in the computer architecture of FIG. 2a.

FIG. 3 shows a top view of first embodiment user manipulated bodies each having a cubic shape with four trackable faces and aligned according to the arrangement of FIG. 1.

FIG. 4 shows the visual learning construct set from FIG. 3 with the body i.d assignments.

FIG. 5 shows example lessons formed using the construct set of FIG. 4.

FIG. 6. shows possible linear arrangement rules for each lesson of FIG. 5.

FIG. 10a shows the contents of the header structure transmitted from the host adapter to each body.

FIG. 10b shows the contents of the display structure transmitted from the host adapter to each body.

FIG. 12. is a illustration of the internal contents of the position-matrix data structure stored in ROM of each I/O apparatus after a series of object tracking sequences, according to the example arrangement of FIG. 3.

FIG. 27 shows the measured distances recorded in each non-trigger body during one sequence of object tracking.

FIG. 27a shows the transformation of wave form used to drive the ultrasonic transducer location sensor used in the second embodiment of each i/o body.

THE FIRST EMBODIMENT

Figure 1:
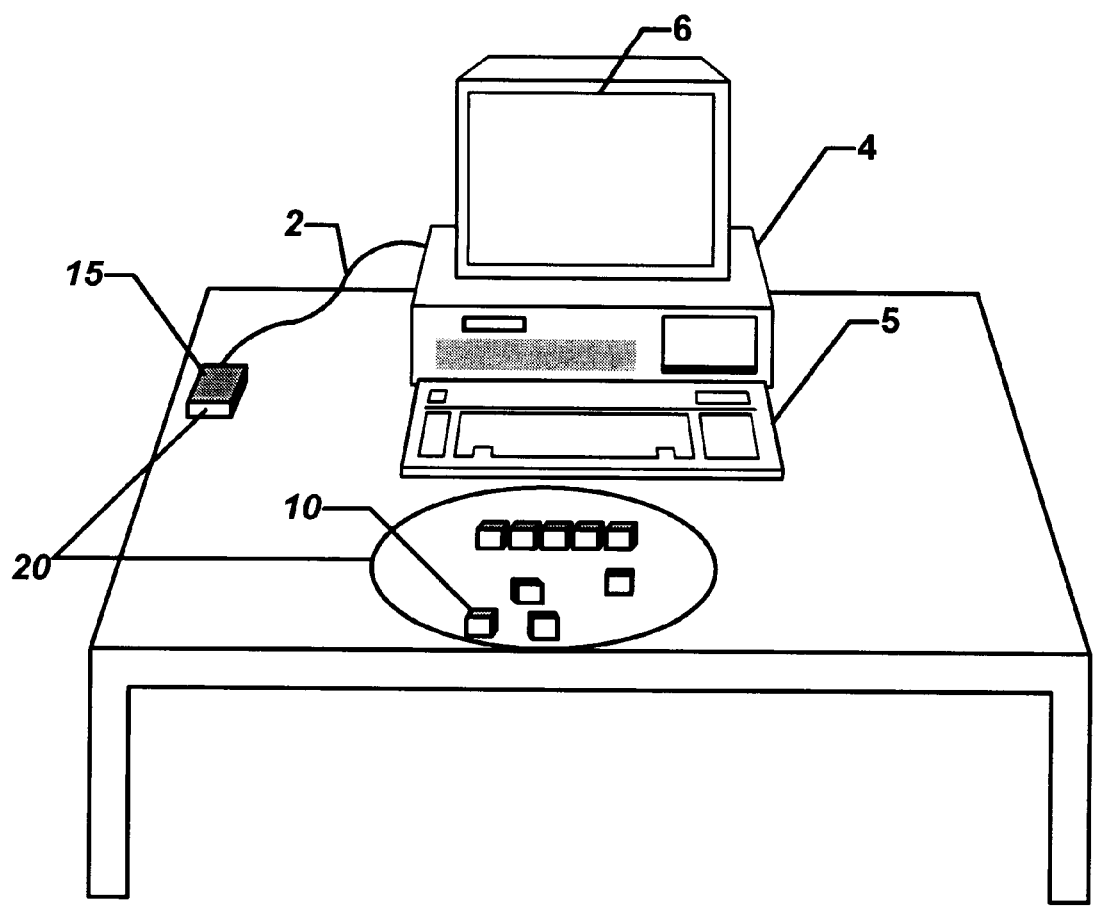
FIG. 1 shows a training system with a control apparatus consisting of a host adapter and a group of nine user manipulated bodies.
Figure 2A:
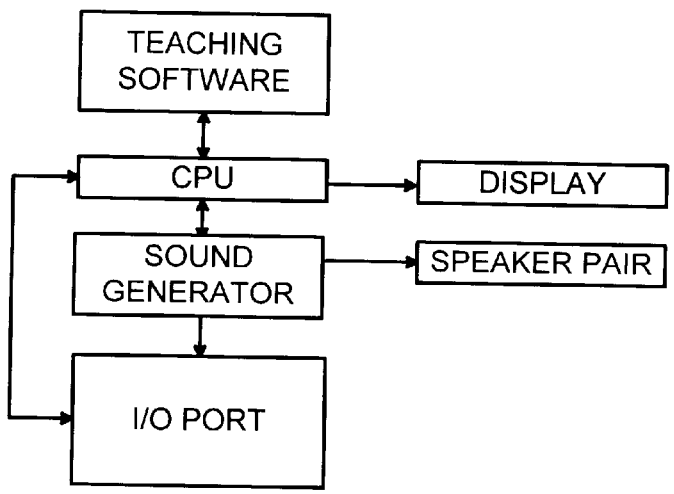
FIG. 2A is a block diagram illustrating one typical computer architecture having an internal sound generator.
Figure 2B:
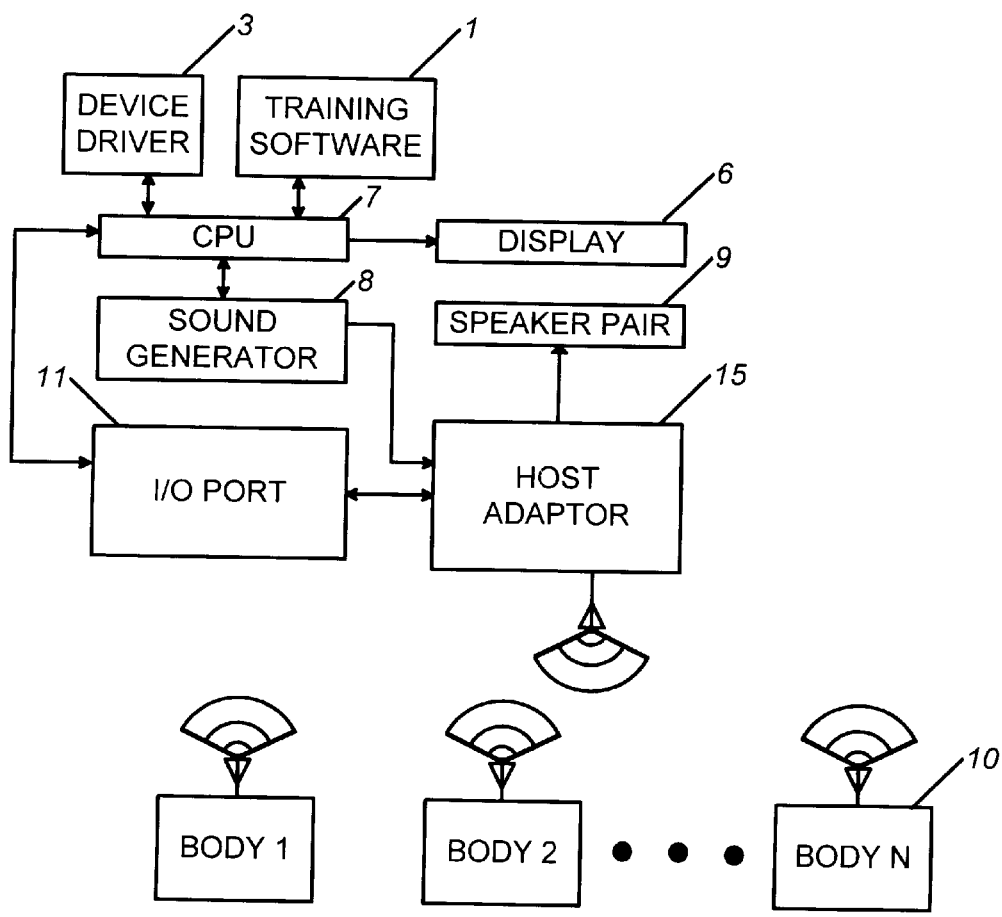

Referring to FIGS. 1 and 2 there is shown one complete training system having a control apparatus 20 comprising a plurality of user manipulated I/O devices 10 and a host adapter apparatus 15. Host adapter 15 is connected to computer 4 through input/output port 11 via connector cable 2. The host adapter may optionally be connected to the output of sound generator 8, which may be any audio generating device fostering an audio output port. It is preferred that the sound generator be controlled by computer 4 i.e. a CD-ROM or a soundcard similar to the Soundblaster® or the Proaudio Spectrum®. Computer 4 is comprised of keyboard 5, display 6, and CPU 7 running training software 1.

The training system may be used to teach a plethora of learning material to the developing student by enabling the subject to naturally interact with "learning constructs" which are applied (either through audio or visual means) to each body. The student can be provided learning stimuli through the bodies and may be supplemented by display CRT 6. Certain bodily arrangements trigger 'lesson' events which prompt the strategical emission of audio and/or visual stimuli from certain pre-selected bodies. Each encountered lesson may provide advice, explanation, and/or positive/negative feedback regarding the particular learning construct arrangement. Learning occurs when the student builds a formation and receives direct audio/visual feedback conveying useful information regarding the arranged formation.

One model of creating direct feedback training material for use with the present invention training system will now described in steps 1–5. Afterwhich steps 6–9 detail one known method for implementing the training material using the control apparatus 20 as the primary input/output device.

STEP 1. The first process in implementing the training method requires the identification and creation of a set of learning constructs which will be used in the environment with the student. Learning constructs may be assimilated with reference to the traditional 'flash card', where visual learning stimuli is placed on a card and presented in some fashion according to the underlying lesson. The present invention promotes both the use of visual as well as audio-based learning constructs. Visual learning constructs are bitmap images and typically may include icons representing letters, numbers, symbols, words, punctuation, etc. Audio learning constructs are generally digitized sound samples and may include speech of: letters, numbers, words, objects, sentences, general audio correlated to the underlying visual construct, etc. EXAMPLE: Assume the objective of a teaching session is to teach English words to a student. An identified learning construct set might be comprised of alphanumeric characters, such as ("C", "A", "T", "L", "O", "W", "K", "G", "N"). FIG. 3 shows an arrangement of user manipulated bodies 10 each displaying a bitmap icon representation of learning construct members used for teaching sentence construction. FIG. 4 shows the associated visual learning constructs as applied to each body of FIG. 3.

STEP 2 requires identifying all lessons which may be taught to the student based upon the arrangement of members of the set of learning constructs of STEP 1. Learning constructs are arranged to form "lessons" which may be encountered by the student during interaction with the control apparatus 20. A "lesson" is an arrangement or formation of constructs which invoke a direct feedback response from the training system. Each lesson may reinforce the underlying objective of the teaching session by providing positive or negative feedback to the student regarding the arrangement. Lessons may be identified according to the objectives of the teaching session. As such, the quantity of lessons for any learning construct set varies according to the particular objectives of the teaching session. EXAMPLE: Assume a continuing objective of the teaching session; to teach English words to a student. Step 2 would require a human educator to identify all lessons which reinforce the objective of teaching English words to a student. The lessons in this continuing example may be linear arrangements of the characters in the visual learning set containing the following characters: C,A,T,L,O,W,K,G, N. The feedback associated with each identified lesson may be positive (indicating that the arrangement is a legally formed English word. Or it may be negative, indicating that the arrangement is a not an English word, but rather an arrangement depicting a common spelling mistake. As a result, an educator using the training system described herein may identify the following lessons . . . "CLOWN", "KLOWN", "CAT", "KAT", "COW", "KOW", "TAG", "TOW", "WAG", "WALK", "WALC", "TALK", "TAK", "TALC", "LOW", "LONG", "LAG". [FIG. 5] shows a sample of identified lessons for the learning construct set of FIG. 3.

STEP 3 requires constructing a set of lesson rules which may define the arrangement requirements for all constructs comprising a lesson determined in STEP 2. For each lesson identified in STEP 2 an entry may be created in a table to hold position and tracking rules for each of the user manipulated body used with the training system. Each entry in this position and tracking table may be compared against real-time tracking data received from control apparatus 20 to determine the particular lesson the student has encountered, if any at all. EXAMPLE: Assume a continuing objective of the teaching session; to teach English words to a student. Step 3 would require storing the associated ordering of the constructs for each lesson identified in STEP 2 using the initial construct set ordering (C,A,T,L,O,W,K,G,N). Thus "CLOWN" would foster an ordering of 1,4,5,6,9; "KLOWN" would have an ordering of 7,4,5,6,7; "CAT"=1, 2,3; "KAT"=7,2,3, etc. FIG. 6 shows the linear arrangement rules for each identified lesson of FIG. 5.

Figures 7, 8:
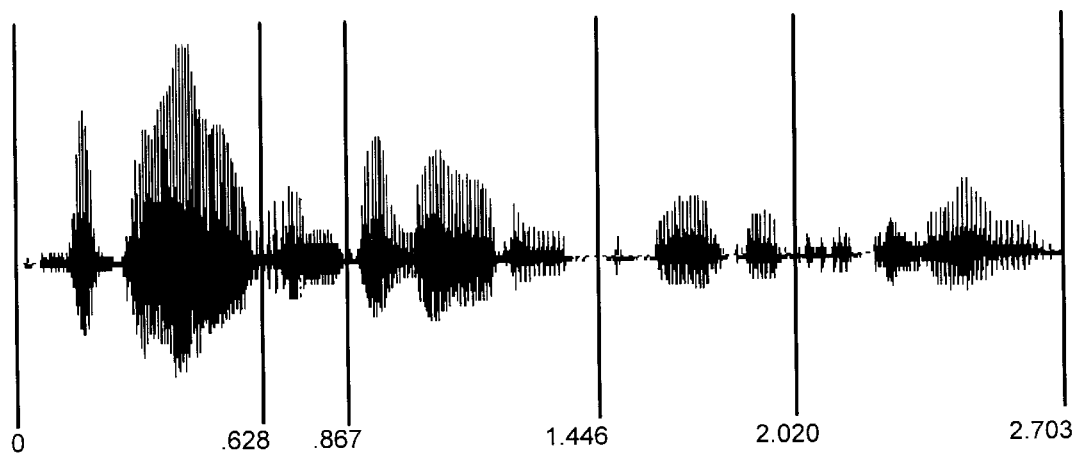
FIG. 7. is an amplitude % vs. time audio feedback graph for the example lesson arranged in FIG. 3 i.e. a sampled voice saying "the boy and the lady planted a tree", with frame segment points shown.
FIG. 8. shows the audio segment table identifying body speaker settings for the segmented indexes of FIG. 7.

STEP 4 requires creating and storing display-based and/or speaker-based feedback providing reinforcement for, or explanation of, each lesson identified in STEP 2. Every lesson is an arrangement or formation of learning constructs which invoke a direct feedback response from the training system. Feedback may also be prepared and stored in advance. It may be audio-based, video-based or any combination thereof. Audio feedback may be a continuous digitized sample, a midi file containing music or noise, or any generic sound emitted from sound generator 8 in response to the movement of bodies in the control apparatus. Video-based feedback may be single or multiple frames of bitmap images. EXAMPLE: Assume the continuing objective of the teaching session; to teach English words to a student. An educator performing Step 4 may record a digitized sample of a voice SAYING and SPELLING each lesson identified in STEP 2 i.e. for the lesson "CLOWN", he may record "CLOWN . . . [C][L][O][W][N]", perhaps followed by a sample of a clown laughing <laugh>. For the lesson "KLOWN", he may record a voice spelling the characters used in the incorrect arrangement followed by negative feedback i.e. "[K][L][O][W][N] IS INCORRECT". For the lesson "CAT", perhaps a different voice may be sampled to say "CAT . . . [C][A][T] <meow>" and for the lesson "KAT", perhaps yet another voice says "[K][A][T] IS INCORRECT", etc. FIG. 7 shows the digitized audio sample for the lesson arranged in FIG. 3.

STEP 5 requires creating a targeting strategy for the speaker-based feedback of STEP 4. Audio feedback generated in STEP 4 may be routed to 0 or many user manipulated bodies 10 of the control apparatus 20. Routing requires creating an audio segment table, shown in FIG. 8. This table is typically prepared in advance with the assistance of a sound editor (such as WAVE SE® from Turtle Beach Systems). The editor may be used to fill the audio segment table with the precise time FRAMEs when the speaker status of any user manipulated body is to change to on or off. The table may also be prepared dynamically, according some feedback pattern determined by the training software. EXAMPLE: Assume the continuing objective of the teaching English words to a student . . . For all lessons providing positive reinforcing feedback (for properly arranged English words such as "CLOWN" and "CAT") the educator may provide a complex audio segment table which indexes the continuous digitized sample into segments. For example, the sample "CLOWN . . . [C][L][O][W][N] <laugh>" might be indexed so the [C] segment is effectively routed exclusively to the body displaying the bitmap character "C". This may be accomplished by sending control signals to all other bodies turning off their speaker output. In the continuing example the [L] segment from the sample may be defined as a routing instance to allow the targeting of audio to the exclusive body displaying the bitmap "L", etc. Perhaps the person creating audio may route the initial pronunciation of "CLOWN" and the terminating laughter <laugh> to all five of the user manipulated bodies which forming the "CLOWN" cluster. This routing strategy will focus the student's eyes and ears on the complete word, exclusively on each character as they are being spelled by the voice, and on the complete word as the <laugh> reinforces the meaning of the word.

Steps 6–9 describe how the training material is implemented with the control apparatus 20.

STEP 6 requires the training system to associate each learning construct prepared manually by STEP 1 with at least one user manipulated body 10. This entails mapping each pre-identified member of the learning construct set [FIG. 4] to one or more user manipulated bodies. Mapping occurs by transmitting each pre-defined bitmap image or sound segment to at least one user manipulated body, through the wireless communication link. A table stored in training software keeps track of the mapping between each member of the construct set and it's correlated user manipulated body. For example, assume the continuing objective teaching English words to a student. This would require training system to associate each sequential member of the learning construct set i.e. C,A,T,L,O,W,K,G,N to an ordered list of bodies i.e. "C"=body#1, "A"=body#2, "T"=body#3, "L"=body#4, etc.

STEP 7. The training system tracks and stores the position and orientation of each user manipulated body. As the student manipulates the bodies 10 (now conveying/outputting members of the learning construct set), the control apparatus 20 sends to the training system telemetry data used to determine the location and orientation of each user manipulated body 10. This position and orientation information can be compared against the pre-identified lesson rules of STEP 3.

STEP 8. The training system may determine if the student has encountered a lesson by comparing the tracked position and orientation information from STEP 7 against each set of pre-defined arrangement rules stored in the table of STEP 6. The training system may then compare the location information received from each user manipulated body to the plurality of pre-identified location rules as determined in STEP 3 to determine which lesson the student has encountered, if any at all. For example assume the same objective of the teaching session i.e. to teach English words to a student. Received telemetry information defining the location clustering of user manipulated bodies would be translated then compared against pre-identified lesson rules ({1,4,5,6,9}, {7,4,5,6,7}, {1,2,3}, {7,2,3}. . . for "CLOWN", "KLOWN", "CAT", "KAT", respectively) to determine if the student has arranged a lesson.

STEP 9. If the student has encountered a lesson as determined in STEP 8, the training system may broadcast the prepared feedback and audio routing information to each user manipulated body. The bodies output the feedback corresponding to the arranged lesson determined in STEP 9.

The above example illustrates only a small fraction of how the control apparatus can be configured to enable dynamic learning between itself and the developing student. It should be understood that their is virtually no limitation on the amount, or degree of complexity that the stimuli embodies since the stimuli is stored and generated on the underlying computer or on the external sound generating device. It should also be understood that the above method of direct feedback instruction can also be used without modification as a medium for creating simulation gaming and other entertainment-based gaming for any user.

The Control Apparatus

Figure 9:
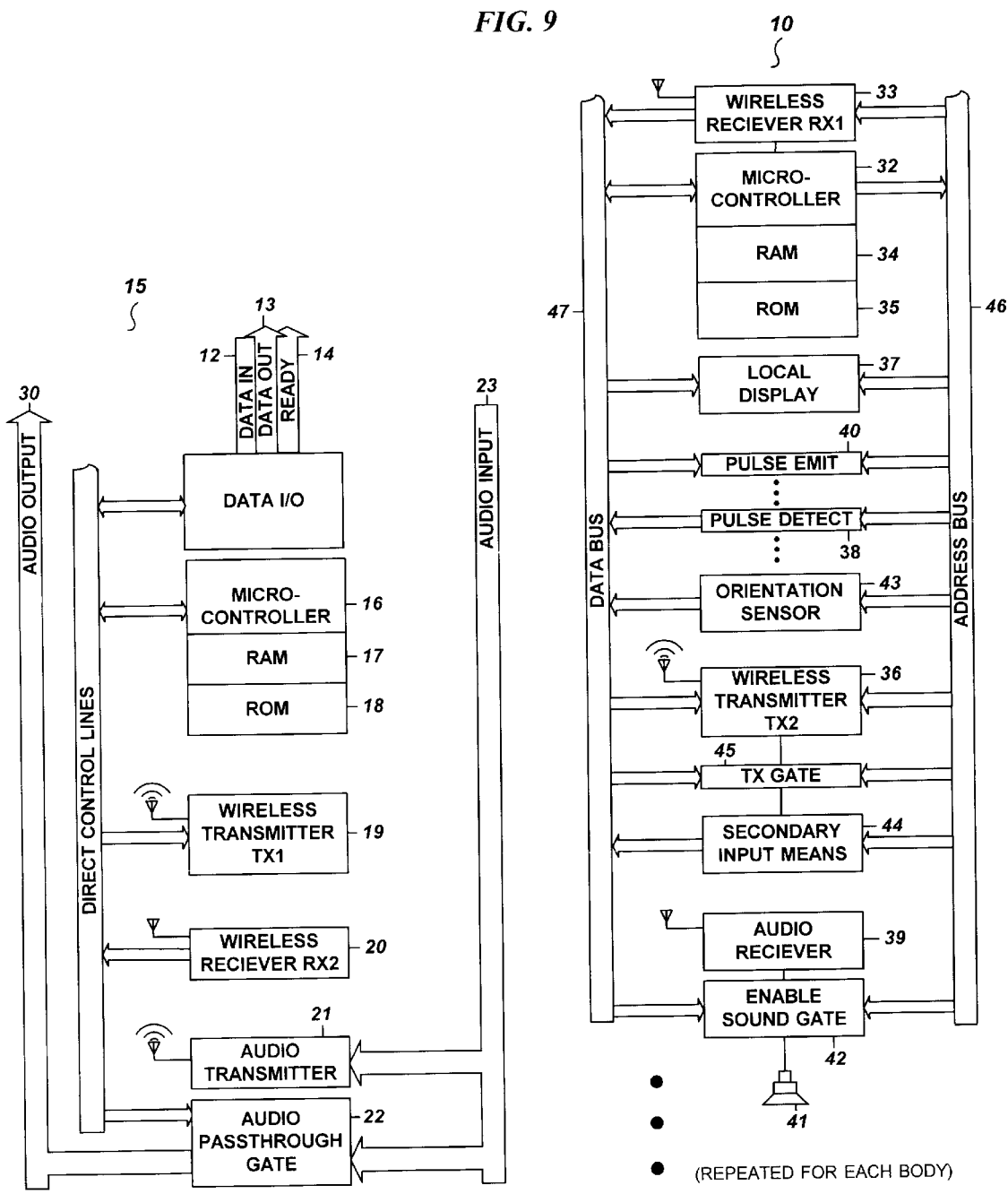
FIG. 9 is a block diagram showing the first embodiment control apparatus.

FIG. 9 shows the host adapter 15 comprising a microcontroller 16 having ram 17, ROM 18, a wireless transmitter 19, a wireless receiver 20, a second wireless transmitter 21, and audio passthrough gate 22. Audio enters the host adapter from input port 23 to audio transmitter 21, and gate 22. Audio transmitter 21 broadcasts audio from input port 23 to audio receiver 39 in each user manipulated body 10. Audio passthrough gate 22 gates the input from input port 23 to output port 30 which connects to optional speaker pair 9. The default for gate 22 is closed, enabling sound generator 8 to pass audio to the paired speakers 9 through the host adapter 15 when the control apparatus 20 is not being used. Gate 22 is required for turning off paired speakers 9 when the training software requires output from device 8 to be exclusively channeled to one or more of bodies 10. The state of gate 22 is controlled by the training software running in RAM on computer 4, through device driver 3, also stored in ram on computer 4.

Host adapter microcontroller 16 may be a Microchip PIC16C71 or any equivalent control means. It may be driven by a 3.564 MHz colorburst crystal oscillator and contain various programs stored in ROM 18 to manage the wireless pulse data transfers between host adapter 15 and the controlled computer 4, as well as between the host adapter 15 and each user manipulated body.

FIG. 9 also shows a user manipulated body 10 each of which may contain wireless receiver 32, wireless transmitter 36, local display 37, gate 38, audio receiver 39, light emitter array 40, light detector array 38, speaker 41, orientation sensor 52, secondary user input means 44, and microcontroller 33 having ram 34 and ROM 35. Microcontroller 33 may also be Microchip PIC16C71 or equivalent driven by a 3.564 MHz colorburst crystal oscillator.

All data may be transmitted between the host adapter 15 and the controlled computer 4 at a data rate of 19.2 BPS through i/o port 11 via serial connector cable 2 having data input pin 12, data output pin 13, and data ready pin 14. Microcontroller 16 may set data ready pin 14 to high when the host adapter is engaged in data transfer between itself and any user movable device 10. The data ready pin 14 otherwise may be held low indicating that microcontroller 16 is ready to receive a frame of data. Data may flow from training software 4 to device driver 3 where it may pend until data ready pin 14 on cable 2 is high at which point it may commence transfer to the host adapter. Data may be transferred one frame at a time and may be packaged with 1 start bit, 8 data bits, 1 stop bit, with no parity. The start bit can cause microcontroller 16 to engage an interrupt service routine stored in ROM 18.

The interrupt routine may record the status of data input pin 14 for each of the 8 transmitted data pulse bits. It may appropriately shift the bits and ANDs them into an 8 bit register stored in microcontroller 16. The routine, functioning as software UART may be terminated upon receiving the stop bit which causes the 8 bit register holding frame data to be copied in ram 17. Multiple data frames may be combined into data structures starting with a 24 bit (three frame) packet describing the data structure. The first bit in a transfer packet may be a control signal to set the state of the host adapter audio passthrough gate 22. The second bit in the first frame may indicate data type; display or audio data. The remaining 6 bits may be ignored. The next two frames may indicate the length in bytes of the data structure to be transmitted. The length may be used to segment an incoming pulse steam into structures holding display-based, or audio-based content. A display structure may contain a list of bodies references followed by a shared bitmap image associated with each referenced body. The display-receive-set-table will hereafter reference this said list of bodies.

An audio packet shown in FIG. 8 may consist of variable length audio segment table. Each record in the variable length table may be comprised of three bytes of time frame index, followed by a 9-bit (one bit for each body) control signal or the audio-passthrough-set-table which may encode for each body the respective on/off demand setting for speaker 41. The three byte time frame may indicate the time in milliseconds when each body should engage or disengage speaker 41 according to the demands set forth in the audio-passthrough-set-table for each associated time frame. It may also be used to prompt wireless dispatch of the audio-passthrough-set-table for setting all body speakers at the appropriate targeted time frame. Still with reference to FIG. 8 an example audio segment table is shown segmenting a continuous feedback sample for the "lesson" arranged in FIG. 3. The sample is a man's voice reinforcing the lesson, saying "The boy and the lady planted a tree". It contains six time frame instances each with an "audio-passthrough-set-table" indicating the speaker settings for the bodies. The first segment (from instance 0 to instance 628 milliseconds) is the time-slice partition of the mans voice which begins and ends with "the boy". The associated audio-passthrough-set-table in FIG. 8 indicates that body#6 will exclusively have it's speaker enabled at the start of the segment. The second segment (from time instance 628 to 867) is a partition of the mans voice which begins and ends with "and the". At the start of this segment, body#7 will engage it's speaker while body#6 disengages it's speaker. The third segment (from time instance 867 to 1446) is a partition of the mans voice which begins and ends with "lady". At the start of this segment, body#3 will engage it's speaker while body#7 will disengage it's speaker. The fourth segment (from time instance 1446 to 2020) is a partition of the mans voice which begins and ends with "planted". At the start of this segment, body#8 will engage it's speaker while body#3 will disengage it's speaker. The fifth segment (from time instance 2020 to instance 2703) is a partition of the mans voice which begins and ends with "a tree". At the start of this segment, body#9 will engage it's speaker while body#8 disengages its speaker. At the end of this segment, body#9 will disengage its speaker so that all speakers are reset.

In summary, for output processing, the host adapter may receive display and audio structures from the training software. These structures may contain video and audio output used for the definition of learning constructs, as well as for directed feedback. As such, both display and audio structures may each occupy control signals which are used to manage the visual and auditory output process of the control apparatus. It need be stated that various other protocols, including those fostering error correction exist and may be used to pass data from controlled computer to the host adapter, one skilled in the art would be knowledgeable and capable of applying.

Body Position Tracking

For input the control apparatus tracks the positioning of each user manipulated body with an interrogation method using sequences of regulated pulse emission and detection. The position of a body with respect to the other bodies is determined by emitting a pulse from the body tracking means while other bodies simultaneously await and store detect information. In the first embodiment detect information is binary in that the absence or presence of received light the pulse detecting body is recorded, while in the other embodiments detect information is the recorded delay in the ultrasonic pulse arrival time giving the radial distance between the pulse emitter and each pulse detector.

For the first embodiment each body tracking means is comprised of at least one paired pulse emitter 40 and pulse detector 38. Each paired photo-emitter and photo-detector should be placed flush to each face with each respective emission/detection angles pointing perpendicular away from the center of the body. They may individually or together be placed inside an enclosure made of a material non-transparent to the chosen light frequency to control the respective viewing angles and to provide tracking calibration. Nonetheless the positioning must enable a pulse of light from one body to be received by an adjacent and neighboring body in apposition thereto.

Figure 11:
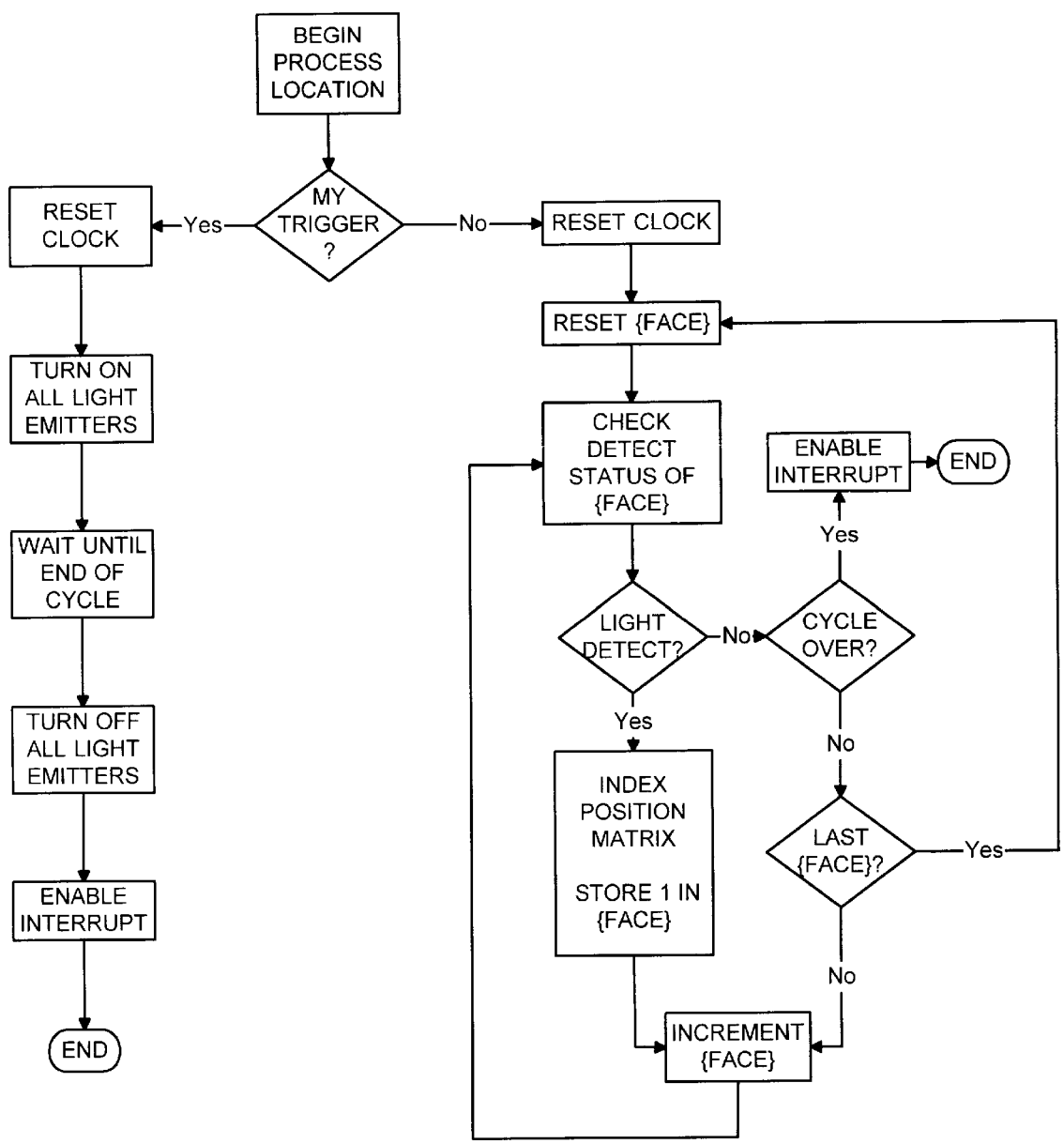
FIG. 11 is a flowchart of the {process_location} function carried out by each I/O apparatus during one interrogation sequence of body tracking.

FIG. 11 details the {process_location} routine which may be used to cycle through one "sequence" of body tracking.

Each sequence has an associated "trigger" body which is the designated pulse emitting body for the sequence. Upon engaging in a sequence the "trigger" body emits a light pulse from each photonic emitter while each non-trigger body is records photonic detect status. When the emitting trigger body is adjacent to a detecting body the light is received in the latter the photodetector assigned to the adjacent generates a signal prompting a flag to be stored in response thereto. Thus the face assigned to the light-receiving photodetector is identified as being adjacent to the particular trigger body.

Such tracking data may instantly be transmitted back to the host adapter or may be stored for future batch transmission. In the latter case, the detect bits may be stored in the "position matrix table" (shown for each body in FIG. 12). Its depth is defined by the number of configured bodies and whose width the number of tracked faces per body. Each column in the width is associated with a photodetector assigned to a particular face, and each row to the particular trigger body. The table is complete only when every row is filled with detect status. Completing the table requires each body to trigger at least one time.

Figure 13A:
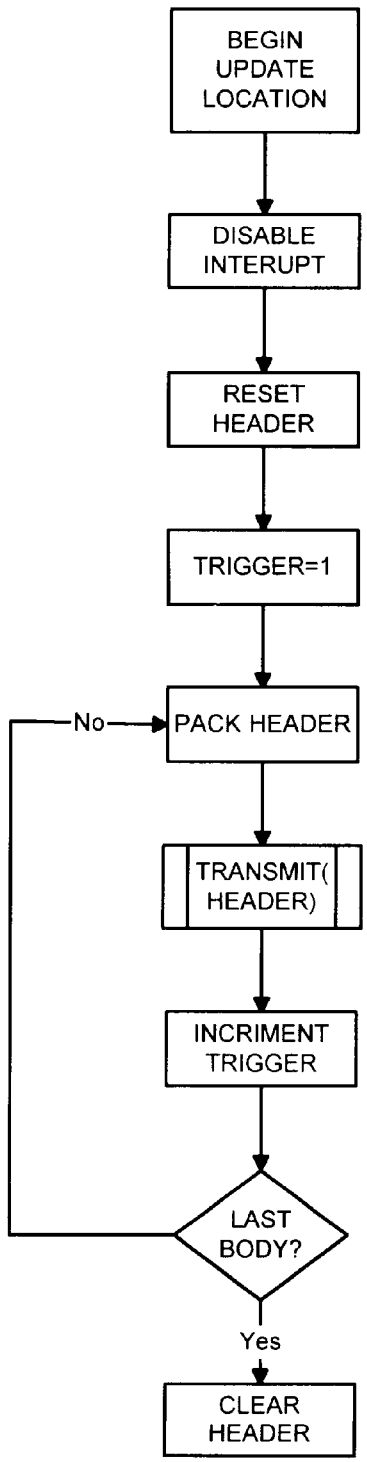
FIG. 13a–13b is a flowchart of the {update_location} function initiating the series of object tracking routines carried out by the host adapter to pack and capture the position-matrix table of each user manipulated body.
Figure 13B:
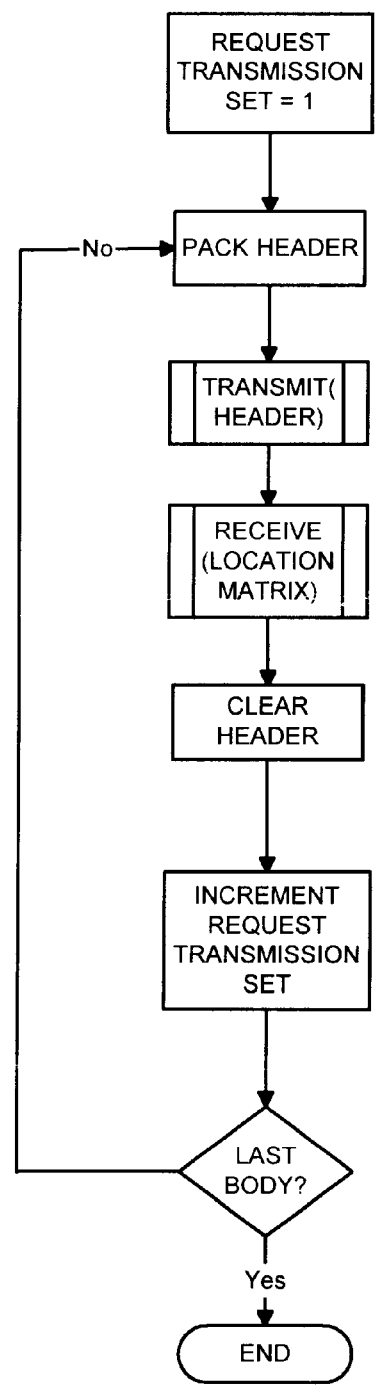

The bodies may automatically engage in a iterative sequence of {process_location} routines presuming each body is time synchronized. Each sequence can alternately be prompted by broadcast control signals. With reference to the latter, FIG. 13a shows a function flow which may be stored in the host adapter ROM 18 and be engaged by periodic time masked interrupts to complete each body position matrix table. The {update location} flow sets the position-trigger set-table to first index the body with body.id=1. A "header" is then transmitted to, received by, and decoded by each body (the header contains all control signals and is discussed in detail later). The body with i.d=1 then engages in the said pulse emit process while the others detect and pack the first row (corresponding to i.d.=1) of their position matrix tables with detect tracking results. The routine then increments the trigger to point to the next body, etc. until the last body is reached, at which point each bodies is sent a control signal to transmit the data back to the host adapter. FIG. 12 shows complete position matrix table with the proper detect bit settings stored in each user manipulated body 10 for the example arrangement shown in FIG. 2.

A control signal may be designated to prompt the transmission of any body's complete position matrix table to the host adapter. The signal hereafter referred to as the request-transmission set-table shares similarity to the position-trigger set-table in that it may be null, or active with one reference body indicated by the position of the active bit. With reference to FIG. 13a the {update_location} routine uses the request-transmission set-table to index the first body. It then packages the control signal in a header and transmits the signal data to the bodies. Shortly after the bodies decode the signal the first body transmits its position matrix table back to the host adapter. The routine incrementally loops through prompting each body to broadcast the positioning data back to the host adapter.

The output of the host adapter wireless receiver 20 may be connected to microcontroller 16 for receiving and storing each received position matrix table in ram 17. Once all the data is received it may be batch transmitted to the controlled computer. The data can be passed along serial cable 2 through data output pin 13. The output of the host adapter wireless receiver 20 may alternately be connected directly to the input of the controlled computer which, upon interrupt, would run a stored program to receive the pulse train data from each body.

It must be stated that other similar tracking methodologies can be implemented to achieve the same tracking results but without the use of the prompting control signals. One known configuration would require each body to store a duplicate time schedule which identifies at which time instance each body is scheduled to 1) engage in pulse emission as a trigger body, 2) to engage in detection as a non-trigger body, and 3) to broadcast the tracking results back to the host adapter. Each body control means would need be one-time time-synchronized upon initialization and would require to maintain a timer so that each body may engage in a particular task at the required time instance. Synchronization can occur during initialization through a photonic pulse generator.

It is known at the present time that position tracking may also be alternately performed by replacing the array of light emission and detection means with a magnet and hall-effect device in each body and measuring the changing strength of the magnetic field generated by the opposing polarity of two bodies as they are manipulated by the user. Such devices automatically generate output signals in response to the respective movement thereof and without the prompting of the same. It is also known that the absolute location of each body may be tracked using photosensitive resistors and light emitters and deriving distance through the proportion light received in each photoresistor.

Body Pitch and Roll Sensing

To enhance the object tracking capability of control system an orientation sensor may be placed in each user manipulated body for tracking it's pitch and roll. Though any orientation sensing means may be used, the orientation sensor of the present invention uses a combination of mechanical and electronic means to achieve variable resolution pitch and roll tracking.

To precisely define the pitch and roll sensing methodology in the context of the present invention, it will first be assumed that each user manipulate body 10 is embodied in a cubic polygon shell such as that shown in FIG. 2. Keeping with the same objective, it will second be assumed that the resolution of the example sensor will provide resolution to ascertain which face the cubic lies on the ground surface. Though it will be shown that the resolution of the sensor can be increased with incremental design change to the sensor and be placed in any shaped body.

Figure 14A:
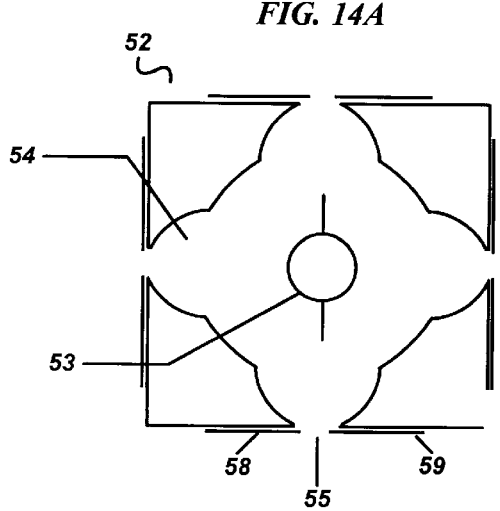
FIG. 14a shows the top view of a pitch and roll sensor used to determine the orientation of a user manipulated body.
Figure 14B:
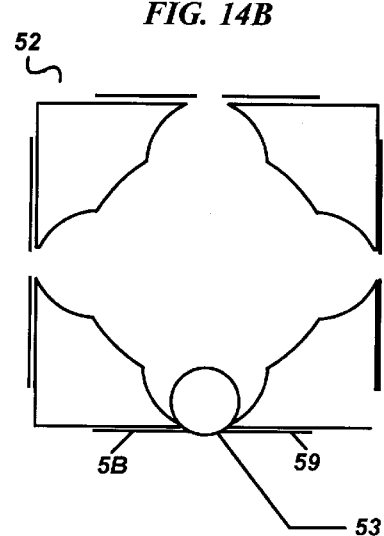
FIG. 14b shows a side view of the pitch and roll sensor of FIG. 14.

With reference to FIG. 14a, there is shown a top view of an orientation sensor used to determine the pitch and roll of a cubic polygon. FIG. 14b shows a side view of the same device. The orientation sensor 52 is comprised of an electrically conductive ball 53, and a hollowed spherical body with six elongated concave cavities 54 located at referential points of perpendicularly to each face of the underlying cubic polygon. The conductive ball is sealed inside the spiracle chamber and is free to roll around into and out of each cavity 54. Each cavity 54 fosters a hole 55 with diameter roughly one half that of the diameter of the conductive ball sealed inside the chamber. Each hole is placed at the cavity cusp and positioned parallel to an unique face of the cubic polygon.

Figure 15:
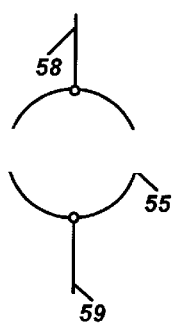
FIG. 15 shows an open circuit empty cavity of the pitch and roll sensor.

Each cavity 54 fosters two electrical pathways which both lead to edges of the cavity hole [FIG. 15]. The electrical pathways are not connected. One path is provided with a small constant current. The other path 59 is connected to microcontroller 32. Each of the six cavities 54 are wired similarly, with independently addressable control input lines leading to path 59 associated with each hole.

When the body is placed on a flat surface, gravity forces the conductive ball of sensor 52 to fall into the cavity corresponding with the face touching the surface. As the orientation of the cubic body changes, the conductive ball follows the vector of rotation by entering and exiting each cavity parallel to the surface below. At the end of the rotationary period, the ball becomes fixed in the cavity with corresponding face in apposition to the surface.

Figure 16:
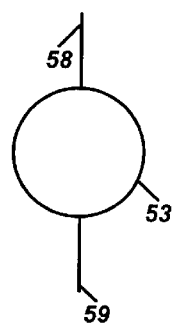
FIG. 16 shows a closed circuit cavity of a pitch and roll sensor.

When the conductive ball is settled inside a cavity, the current from associated path 58 travels through the conductive ball 53, to associated path 59, shown in FIG. 16. When the ball is not centered in a cavity, the circuits joining path 58 to path 59 are open (in each cavity). The electrically conductive ball thus functions as a gate, opening and closing particular paths corresponding to the cavities it enters and exits them.

Microcontroller 32 runs a program stored in ROM 18 which periodically checks for current on each of the control lines leading to each path 59. The microcontroller receives either a null or high input from the control lines, depending on whether the circuit is open or closed.

Figure 17A:
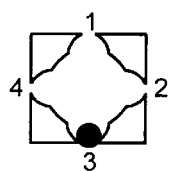
FIG. 17a–17e is an illustration of the orientation pitch and roll sensor of FIG. 14b being rotated 90 degrees.
Figure 17B:
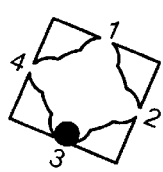
Figure 17C:
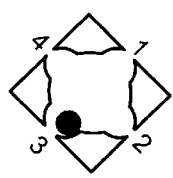
Figure 17D:
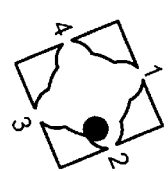
Figure 17E:
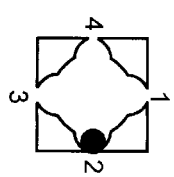

FIG. 17a shows the sensor 52 as placed on a flat surface. Gravity pulls the conductive ball 53 into cavity #3 which is perpendicular to the face laying on the surface. As the cubic body is rotated 90 degrees, [FIG. 17a–e], the conductive ball rolls out of cavity #3 opening the circuit connected to the hole associated with cavity #3. The conductive ball continues until it is slated in cavity #2, closing the circuit associated with hole #2.

Microcontroller 32 is able to determine the change in orientation by the change in current on it's control lines connected with each hole. The controller may store a history of status change for each cavity in a table in ram. The table for a cubic polygon would foster six bits of width to accommodate a status for each cavity. The table may variable depth to maintain a variable history of status change. The table could be attached to the end of the position matrix table and transmitted back to the host adapter 15 with a modified {update_location} function.

Though the sensor shown in FIG. 14 is designed to track orientation of a cubic polygon, it can be easily modified to determine the pitch and roll of any three dimensional polygon. This would require that the sensor have N cavities, one for each face of the tracked three dimensional n-gon. Each cavity hole would foster the same wiring requirements, and the positioning requirements relative to the cavity cusp. Though the additional requirement would be that each hole be positioned concentric to each face. Also, the sensor itself must be positioned concentric to the underlying three dimensional N-gon. These measures insure that sensing chamber encasing the conductive ball rotates at the same angle as the underlying polygon.

Note, their is direct relationship between the number of faces N, tracking resolution, and the depth of each cavity. The relationship holds that as N approaches infinity, tracking resolution approaches infinity while the cavity depth requirement approaches zero. Bearing that in mind, the sensor can theoretically be designed to accommodate virtually any pitch/roll resolution requirement.

Wireless Pulse Communication Protocols

Figure 18:
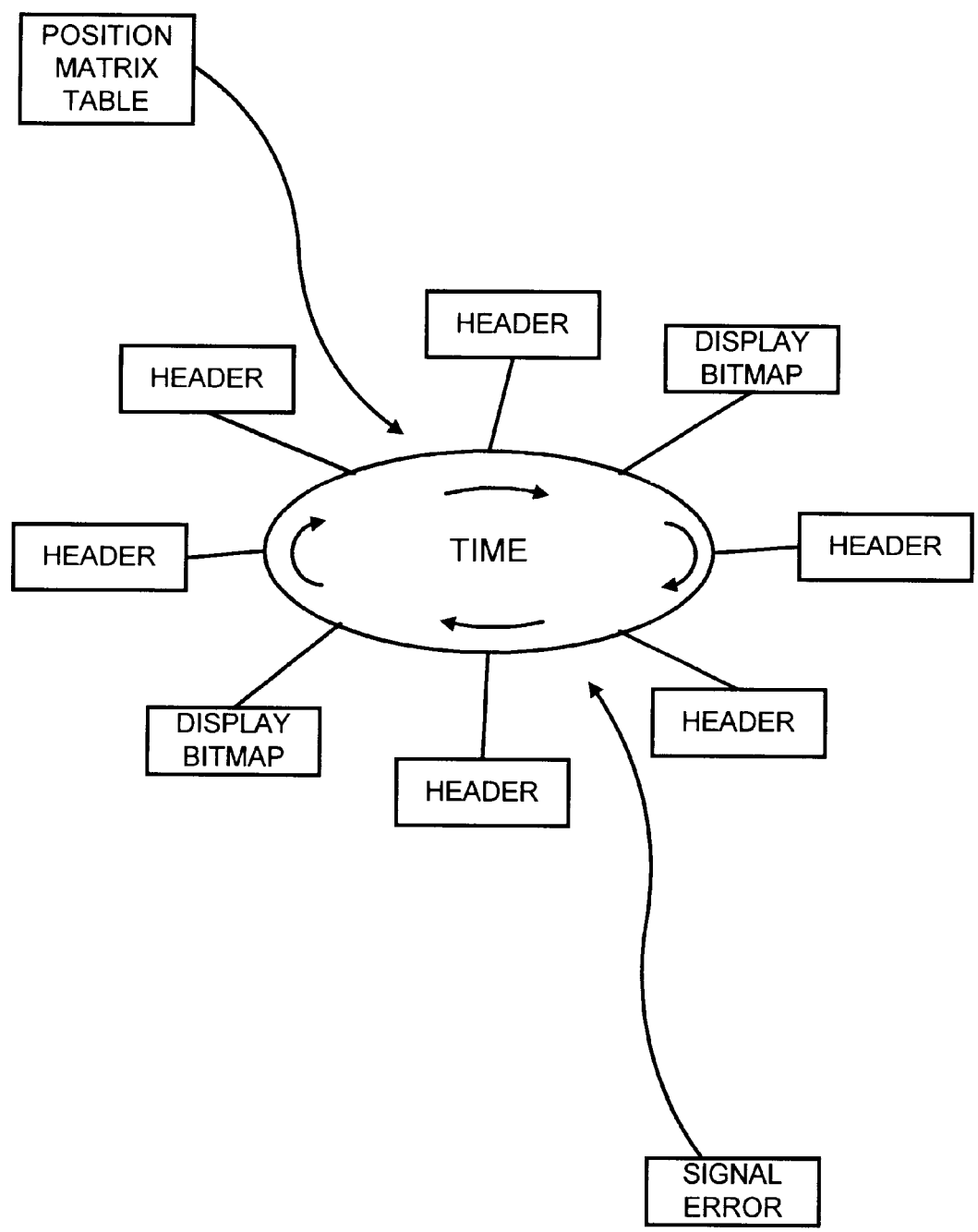
FIG. 18 shows data packet exchange between the host adapter and each user manipulated body over time.

A plurality of information may be exchanged between each user manipulated body and the host adapter. On one hand, each body may transmit a position matrix table to the host adapter. On the other hand, each body may receive display and control header-based data structure from the host adapter. FIG. 18 shows the various example types of data exchanged between the host adapter and each body. Data swapping may be handled through pulse radiation transmission and receiving functions which can be used over a variety of operating pulse frequencies including RF, lightwave, and audio.

TABLE 1

CONTENTS OF A HEADER

| Control Flow Signal | Description |
| --- | --- |
| Audio Passthrough Set Table | Holds one frame of speaker gate settings for all configured bodies. |
| Position Trigger Set Table | Triggers one body to emit tracking pulse, others detect and record. |
| Transmit Request Set Table | Triggers one body to transmit its position matrix table. |

The header can be periodically transmitted to the bodies and contain control flow/branching signals as well as software switch settings for each body. A plurality of information may be contained therein including speaker settings, tasking tables (for packing object tracking tables), and transmission tasking tables (for the orchestration of pulling position-matrix-tables from the bodies to the host adapter). FIG. 18 shows a header packet and its respective control signals, and a display packet. Table 2 summarizes a possible configuration for structuring a transmission handshake enabling a synchronous communication link between sender and receiver. Transmitted data may be location telemetry, user input, control data, or display data. Each variable below may be pulse radiated digitally through host adapter transmitter 19 to each body pulse receiver 32, and visa versa from body transmitter 36 to host adapter receiver 20.

TABLE 2

STRUCTURE OF A TRANSMISSION PACKET

| Variable | Size | Function |
| --- | --- | --- |
| START | 1 BIT | Causes all user manipulated bodied to engage in the MASTER interrupt. |
| DATA-TYPE | 1 BIT | Allows MASTER interrupt to distinguish HEADER vs. DISPLAY packets. |
| SYNC | 1 BIT | Synchronizes sender and receiver to minimize oscillation drift during transmission. |
| LENGTH | 1 BYTE | Identifies transmission length. |
| DATA | VARIABLE | 1 frame of header or display structure. |
| CHECKSUM | 1 BYTE | Used by receiver to verify transmission success/failure. |

Figure 19:
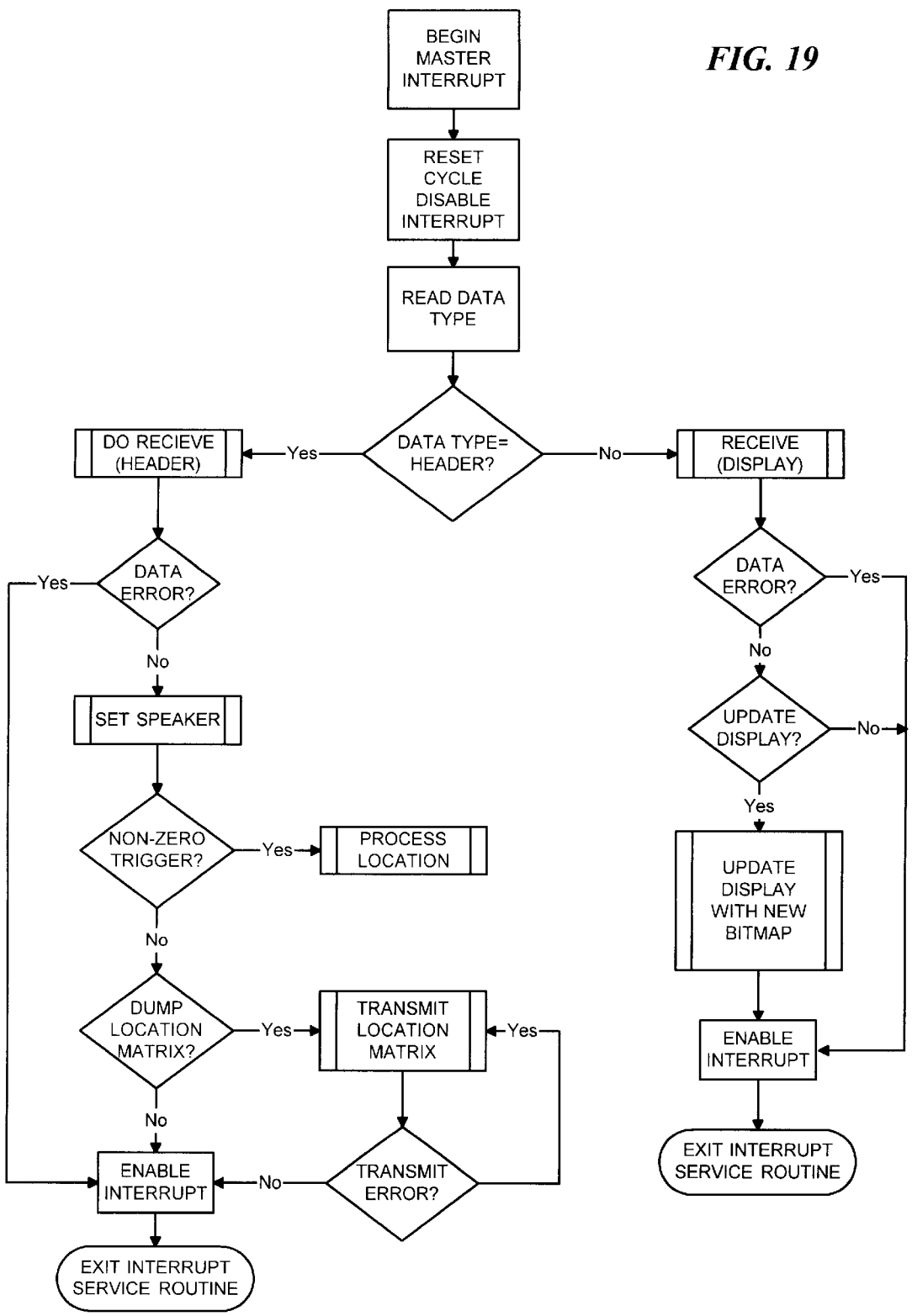
FIG. 19 shows the {master} interrupt service routine flowchart initiated by each i/o body upon receiving the first bit of a radiation pulse train.

Now with reference to FIG. 19, the {master} interrupt flow is shown. The routine may be used for each body to receive, decode and act upon all data transmitted from the host adapter. It may be engaged upon receiving the first pulse of transmission or the start bit from the body reciever. The first function of the routine is to identify the data type and call the {receive} function with the appropriate data-type argument.

With particular attention to FIG. 19, upon receiving the start bit the routine would first reset the system/cycle clock and disable interrupts. This would ensure the host adapter/sender and each receiving user manipulated body are time synchronized during transmission. Second, interrupts would be disabled to ensure the all receiving bodies are not interrupted by normal time-mask interrupts (such as updating the display, etc.) during the transmission of data. Third, the data-type bit would be read to identify the transmission type. If the data type is header, the control flow branches would branch to the left and the {master} routine would read and decode the transmitted pulse train as control signal data. Otherwise the digital pulse train would be read as display data. Assuming the data is of header type and received without error, each body may decode the header and act upon each control signal contained therein.

Now audio settings might be decoded as noted in FIG. 19 where the speaker on/off settings would be handled by ANDing the audio-passthrough set-table with the body.id for the subject body. This status would be written to the enable sound gate 42 which would enable or disable the speaker receiving the audio broadcast from the sound generator.

After the speaker is set the position-trigger set-table may be checked for active/non-zero status. If the table is active then the {process_location} routine may be engaged to perform one sequence of position targeting (see "position tracking" section of application). If the position-trigger set-table is not active the transmit-request set-table may then be checked. Each body may determine whether they are to transmit their positioning data to the host adapter wireless receiver 20 by ANDing the transmit-request set-table with their body.id. Only one body should be selected at a time to avoid data collisions. The {transmit} routine or similar would be called to perform this action.

Display-based data would force the program flow to branch to the right, FIG. 19. If a display data packet is received without error, the body may determine association to the image by ANDing the display-receive ready-set with the block.id for the particular body. A true result may force the body to load the received display image into it's display memory causing the display to show the newly received image. Otherwise the transmitted display bitmap may be ignored.

Wireless Pulse Communication Protocols: Transmit and Receive

The transmit function may be stored in ROM 18 of the host adapter microcontroller as well as ROM 35 of the user manipulated device microcontroller 33. While it may be called upon to transmit data between ram 18 of the host adapter 15 and ram 34 of each user body 10 a slightly modified (simplified) version may be used to send data visa versa. It should be stated that these routines may be used with over any wireless transmission frequency including RF, lightwave, and audio. As such the exchange protocol is described in significant detail.

The transmit and receive functions support variable length data transmission, error detection, and error correction. Variable length data handling is required because the width of the header changes depending on the number of user manipulated configured during any training session and because certain bodily display devices may be configured to support higher x-y resolution (as well as multi-bit color attributes). Error detection and correction are required to accommodate sporadic radio or infrared frequency interference as well as to accommodate potential nulls resulting out of the positioning of sending and receiving antenna (when operating under radio frequency).

The {transmit} flow may be used to send data from the host adapter to each user body. It is shown in FIG. 20. Before describing the details of the function flow, let it be known that {start} and {end byte} may be passed to the function to indicate the segment of ram to be transmitted. These addresses may be sent to the transmit function along with a 1-bit data {type} indicator. Also, {bit} is a local variable with range 0 to 7 and is used to index the subject byte being transferred at any time. Finally, the {write} statement holds the host adapter control line to the wireless transmitter 19 high or low, depending on the setting of {bit}.

Figure 20A:
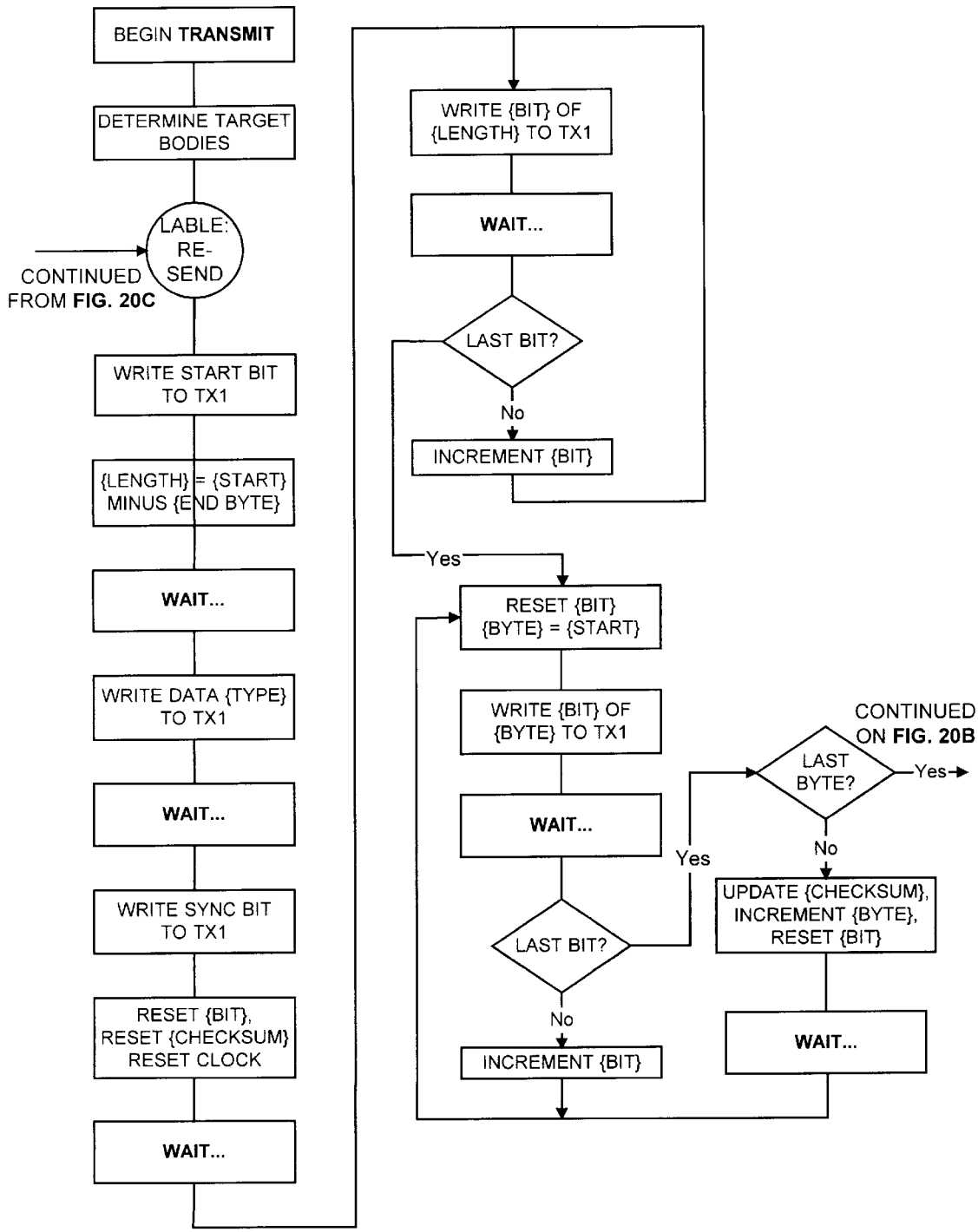
FIG. 20a–20c is a flowchart of the {transmit} function used for encoding and broadcasting pulse radiation data.
Figure 20B:
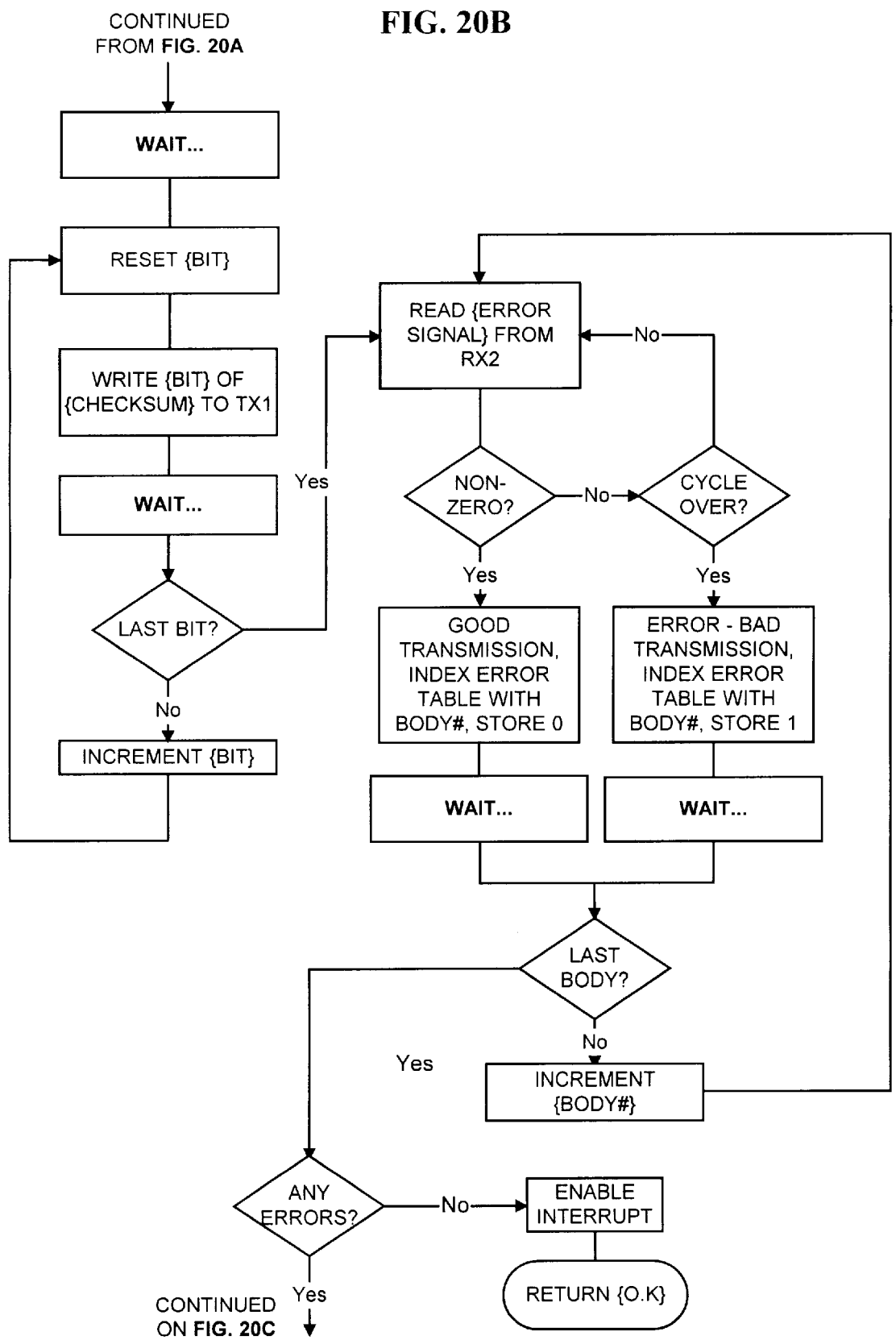
Figure 20C:
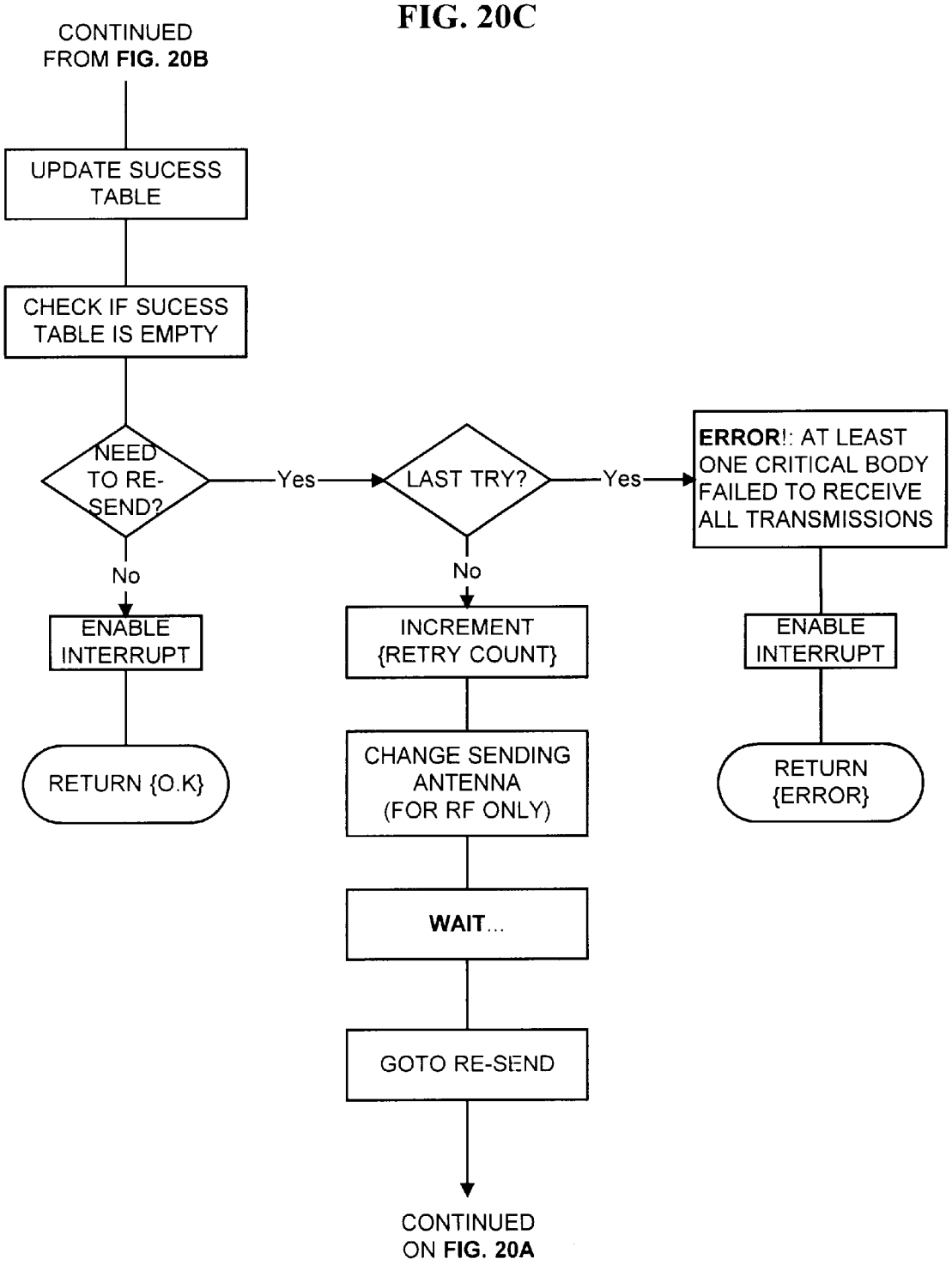

With particular reference to FIG. 20a, The first task called upon by the {transmit} function may be to determine which bodies must successfully receive the transmission data packet. The {determine target bodies} module checks the {type} bit for display or header data type differentiation. If header data is being passed, the {target body set} may be defined by ANDing all three header control signals together. On the other hand, if display data is being passed, the display-ready set-table may be identified as the {target body set}. All bodies referenced in the {target body set} should lie along the critical transmission path and as each must receive the transferred information without error, since the transmitted data is associated therewith.

Now with reference to FIGS. 19–20, the {transmit} function may first {write} the {start} bit to wireless receiver 33 of each user manipulated body causing each body to simultaneously engage in the {master} interrupt service routine. The {transmit} function may then compute the length of the transfer packet and {wait} (about 20 instruction cycles) until each body has reset it's system {clock} and is ready to decode the data type.

Figure 21A:
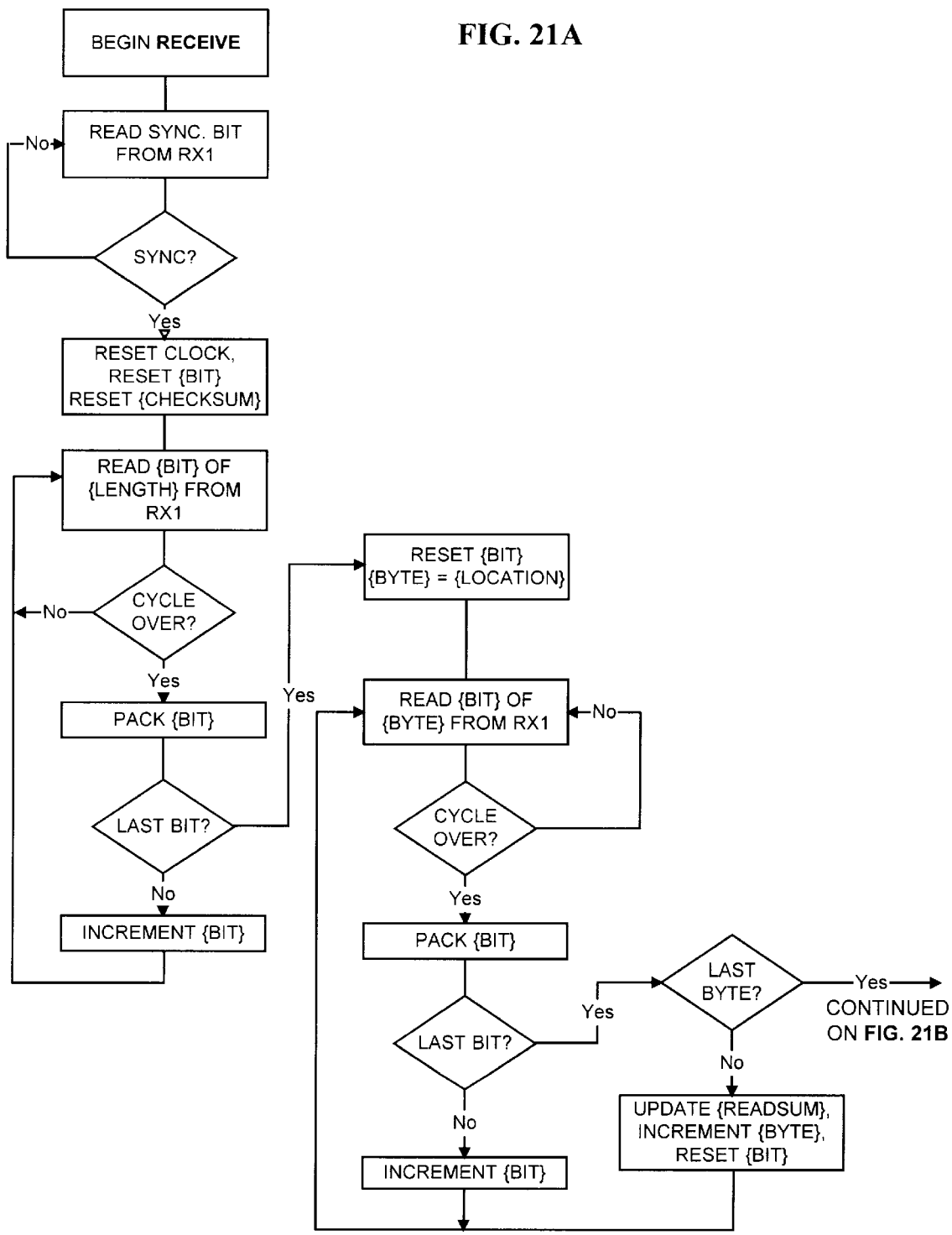
FIG. 21a–21b is a flowchart of the {receive} function used for receiving and decoding pulse radiation data.

The {transmit} function may then {write} the data type and {wait} until the {master} interrupt has decoded the data type and called the {receive} function with the arguments to designate the appropriate data type. Now with reference to FIGS. 20–21, the {receive} function may loop until it receives the {sync} bit before it resets it's internal clock. The system {clock} in both the sending and receiving body may be reset simultaneously to minimize oscillation drift and to synchronize the sending and receiving modulation.

The first {bit} of {length} may then be written to the wireless transmitter and the sender may {wait} (again, about 20 instruction cycles) while the receiving body (1) {packs} the received bit into ram, (2) updates the {bit} index, and (3) starts its next read cycle. The {packs} process involves shifting each received bit left {bit} times followed by ANDing the result with the current {byte}. Updating the {bit} index involves verifying {bit} has a value under 7 and incrementing or resetting it as necessary. Starting the next read cycle involves a entering a read loop and checking the status of the wireless receiver When the sender completes its {wait} cycle it may send the next bit . . . The process may be repeated until the {bit} count in both the {transmit} and the {receive} function is seven. When this occurs, the {receive} function may update it's received checksum (by adding {byte} to {readsum}), update its {byte} pointer, and clear the {bit} index back to zero. The {transmit} function may also update it's checksum (by adding {byte} to {checksum}), it's {byte} pointer, and clear the {bit} index back to zero. This may continue until all 8 bits of the {length} is transmitted, after which the transfer packet may be transmitted. The actual data transfer packet may be transmitted next, in an identical manner in that the sender {waits} after each transmitted bit to assure that the receiver is poised receive it. The only difference is that the {byte} pointer would be moved to point to the beginning address of the transfer data packet instead of the {length} variable. The sender may just loop through a series of {write} and {wait} commands until the entire data packet is transferred.

Figure 21B:
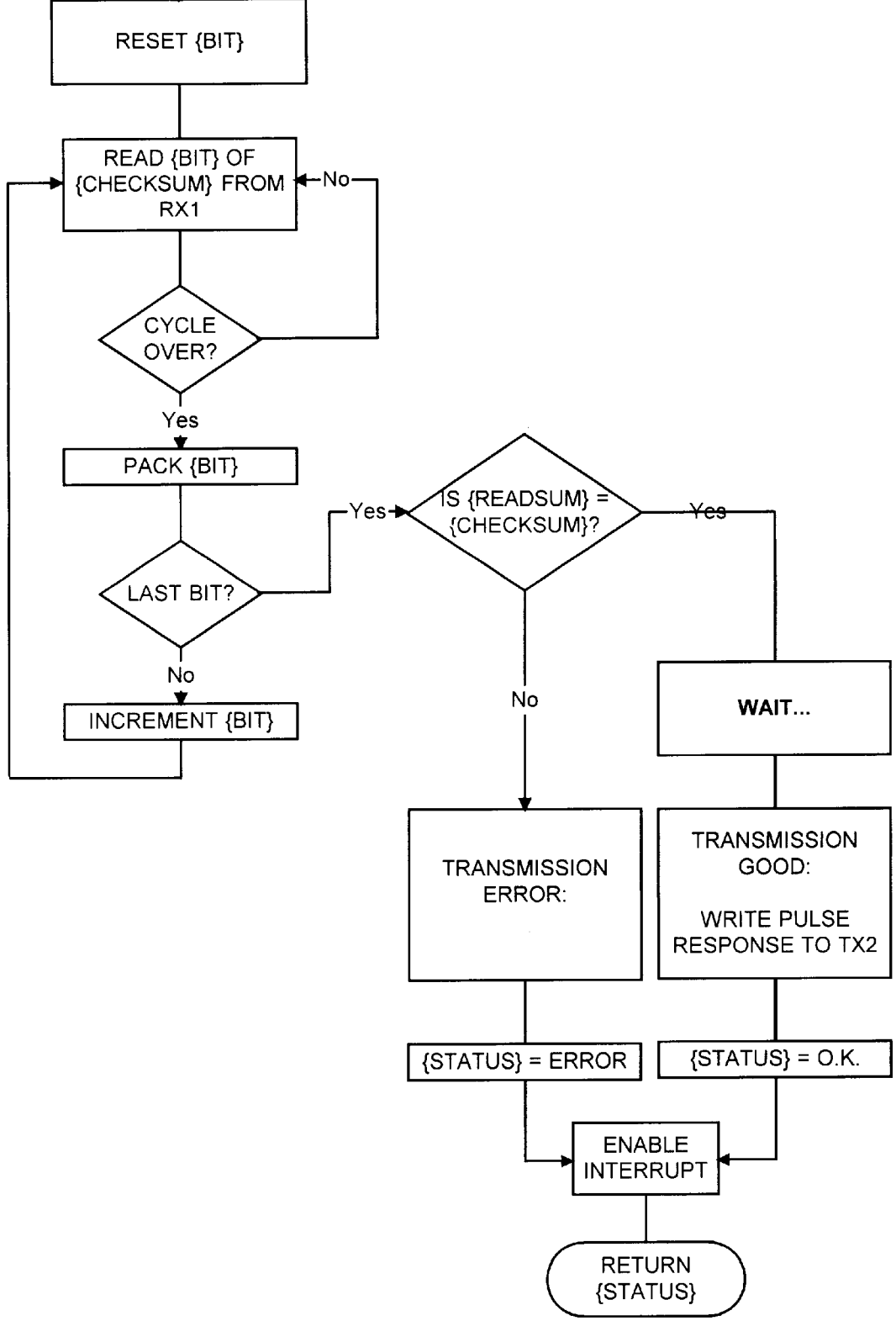

After all bytes of the transfer packet have been transmitted the {readsum} variable in the {receive} function FIG. 21b would hold a summation of received data bits, while the {checksum} variable in the {transmit} function would hold a summation of all transmission data bits.

After the data packet is transferred the value of {checksum} may be transferred to enable the receiver to determine the success status of the transmission. The receiver may load these last 8 pulse bits into the variable {checksum} and compare the value to {readsum} which may be incrementally calculated during each transmission. If the transmission was received in error, then the {receive} function may terminate. Otherwise the receiver may signal back to the sender that the transmission was O.K.

To avoid frequency collisions with such responses each body may have a designated time frame in which a one-bit pulse is generated. Time frames may be designated by the linear ordering of the bodies with respect to their sequential body.id i.e. body 0 goes first, then body 1, then body 2, etc.

After writing the last bit of checksum data, the {transmit} function may switch from being a sender into a receiver to read the transmission success status from each body. This data may be XORed with the {target body set} and compared to zero. A result of zero would indicate that all bodies which needed to get the data got the data successfully, whereas a non-zero result would indicate that there was a transmission problem with at least one critical body. In the latter case the data may be re-transmitted.

It is known at the present time that when operating over radio frequencies three mutually perpendicular antenna can be added to the sender to resolve frequency NULLs in the receiving antenna resulting from orientation mismatch between exchanging antenna. As such whenever data is required to be re-tranmitted due to checksum error an RF transmitter equipped with three mutually perpendicular antenna can cycle through sending antenna until all antennas have been used without success or until all targeted critical bodies have successfully received the data. Antenna selection can be accomplished through the use of controlled gates.

Packet Distribution when Using Prompted Control Signals

The host adapter may transmit data when it is necessary to obtain a location update of the bodies, to update any body's screen data, and to update the speaker setting of any body. The first circumstance may occur when the host adapter periodically updates the telemetry status of the bodies. Host adapter microcontroller 16 manages an internal system clock which may be scheduled to periodically time mask interrupt to call the {update_location} function. As previously described, this function transmits headers containing active position-trigger request-set to load the position matrix table of each body. Then the function transmits headers containing active transmit-location request-set to task each body to transmit their telemetry data. The second circumstance may occur when the training software transmits via device driver 3 new display data for routing to a select set of bodies. When updating screen data the host adapter may transmit the display packet containing an active display-receive ready-set to prepare the appropriate bodies to update their display ram. The third circumstance may occur just prior to reaching a time instance in the audio segment table. Host adapter 15 internal system clock may interrupt microcontroller 16 approximately 100 microseconds prior to reaching the first time frame referenced in the audio segment table. Microcontroller 16 interrupts into a subroutine which packages the audio-passthrough-set-table for the correlated time frame index in the audio segment table into a header. The header is dispatched early so that each movable device 10 has time to receive and decode the speaker setting encoded in the audio-passthrough-set-table. This ensures the speaker event change occurs at the precise time as previously defined during creation of training material with the sound editor.

It must be stated that an independent training system may be configured with a host adapter 15 which assumes the role of the controlled computer 4 by providing storage of the interactive software in a removable or fixed ROM which may attach to the device through i/o port 11 (or be secured therein). The ROM would need store the interactive training algorithms and stimuli/feedback constructs associated thereto, as well as the necessary routines for managing the configured level of wireless communication with the user manipulated bodies. Also, It is known at the present time that, in this or in another control apparatus configuration, the host adapter may be further equipped with a speaker/amplifier, secondary input means, and/or a display means to provide ancillary or supplementary input/output.

Display and Speaker Output Systems

The schematic herein uses an 'active' single color 8×8 LED display matrix for body local display 37. This device may be upgraded with an LCD module or LED multi-color display offering much greater resolution. Also, the selection of images and broadcast display frame rate can be chosen such that the body produce animation. Frame rate could be chosen at an acceptable level to avoid flicker, such as 20–30 frames per second. Large images can be 'broken' into smaller pieces and distributed amongst the bodies so that a bodily arrangement can be formed to generate one synergistic image with total visual effective resolution greater than that of any one body. For example, nine square user manipulated bodies each with an 8×8 display array may be arranged to form a 3×3 bodily square with total effective display resolution of 24×24. The 24×24 'screen' can be used to interact with the subject for example by offering animated puzzles which 'come to life' after they are arranged in the proper predetermined (3×3) lesson order. Alternately the user manipulated bodies may be equipped with a "static" overlay-based which may be scanned by the body.

As such body local display 37 may be comprised of a user-removable 'overlay' containing printed visual constructs. Each body may be configured to determine which overlay is attached to it at any time by scanning an 'overlay i.d' inscribed on the back of the overlay. The scanned overlay i.d. data can be passed to the training system enabling it to correctly associate the static visual construct to the body. This would enable the training system to choose a series of exercises having pre-determined lessons using particular static learning constructs chosen by the user.

The overlay i.d. can be written or encoded in multiple bits on the back of the overlay. Written i.d's may be input to training software 1 through controlled computer keyboard 5. Bit detection may be implemented for encoded id's by placing light reflector and light absorption means on the overlay in opposition to the body position tracking photodetector/emitter pair. Each reflector may be assimilated to a bar code where a black/darkened area absorbs light and indicates a zero whereas a white/reflective area bounces light and represents a high bit. The overlay i.d. can then be read by individually pulsing light from the infrared light emitters 40 while simultaneously reading the status of light received in each photodector 38. The position of the each reflector must allow an unobstructed pathway for a portion of light to pass to ensure that the object tracking is maintained. The length of an encoded i.d. bitstream is defined by the number of trackable body faces configured. The scanned id bitstream can be transmitted from each body during specific, periodic, and non conflicting time intervals or it may be appended to the end of each body's position matrix table and transmitted to the host adapter upon receipt of a prompting control signal.

A static overlay may be placed over a body configured with an active display forming a hybrid static/active configuration. In this configuration training software 1 could accommodate the control apparatus by employing active, static, or combination lessons in which the active display on certain bodies emit output while the fixed overlay provides the remainder of visual output. This configuration would require the photonic emitter/detector pairs to be placed behind an LCD screen, or in the center of an LED array, or in general to be respectively positioned to enable the face holding the display to be a tracked.

In regard to display output processing it must be stated that any user manipulated body comprising an active display may be configured to store multiple bitmap visual constructs. They may be permanently fixed in ROM 35 upon manufacture and/or may be batch loaded into each body RAM 34 upon system initialization or dynamically during an interactive session. For dynamic loading the wireless transmission protocol would require to support an additional data type bit to identify the multiple display load event. Each visual construct would require an id for indexing purposes. Referenced visual constructs once stored in ROM 35 or RAM 35 may be copied to display ram upon receipt of a display page signal passed from the host adapter comprised of display i.d followed a list of bodies tasked to display the referenced visual construct. The display page signal could be stored in the header and decoded in the {master} interrupt routine.

Similarly in regard to audio output processing it must be stated that audio from the external sound generator broadcast over the wireless communication link can be supplemented by digitized audio samples which may be permanently stored in body ROM 35 upon manufacture and/or may be dynamically loaded into body RAM 35 upon system initialization or during an interactive process. For dynamic audio loading, the wireless transmission protocol would require to support an additional data type bit to identify the loading of digitized audio as an event. The digitized audio transmission may include a i.d. for indexing the audio sample upon a playback event. The audio may be transmitted in digital form in which case transmission may transpire through previously stated communication protocols. Whereas having the body digitize incoming modulating audio would require removing the {wait} delay between reading each incoming pulse to achieve the best quality audio sampling.

Referenced audio once stored in ROM 35 or RAM 35 may be played through speaker 41 upon receipt of a page control signal passed from the host adapter. The audio page signal may comprise an audio sample i.d followed a list of bodies tasked to 'play' the stored indexed audio. It may be transmitted in the header and decoded in the {master} interrupt routine. The host adapter may dispatch a series of sequential headers selecting unique audio samples to be played from various bodies, enabling the control apparatus to effectively support multiple 'voice' audio output.

Variable Number of Bodies

It must be stated that the control apparatus need not be limited to nine user manipulated bodies, as was used for example purposes, but could rather adopt and track a variable number of bodies. The bodies may be sourced from multiple control apparatus and combined and controlled under one host adapter by dynamically establishing a body i.d. for each controlled body. One known initialization processes for accomplishing dynamic allocation of bodies would require the user to align the array of bodies required for host adapter control along a known reference vector having each body oriented in a known reference position. After the user performs this activity they could be prompted to press a key on the controlled computer keyboard 5 initiating a control signal dispatch from the training system to the host adapter prompting a system initialization. The initialization process could be a slightly modified version of the location tracking routine though altered to identify the starting and ending bodies of the reference arrangement as well as the total number of bodies for control. Thereafter the modified routine can transmit a series of control signals incrementally encoding each body with an body i.d starting with one and ending with the last body in the reference vector. Alternately, each body may store a unique body i.d. and the total number of bodies configured for the control apparatus in ROM, upon manufacture.

Body Tracking Tray

It should be stated here that it is known at the present time that a "tray" comprised of; an array of photonic emitters and photonic detectors, a storage, and a control means may be used to track the position and orientation of the bodies. The tray may be wired directly to the controlled computer and replace the host adapter or it may be configured with a wireless communication system and used in conjunction with the host adapter. The tray can be designed with a plurality of equal spaced divots the size of each body face enabling a body to fit such that its tracking emitter and detector are directly in apposition to the tray cell photonic emitter and detector. The body tracking functions would be altered such that upon receipt of a tray cell pulse the body emits a response pulse train indicating its body i.d. The tray could also contain audio and visual output subsystems to provide exclusive or supplementary output.

Signal Repeating Body

Figure 22:
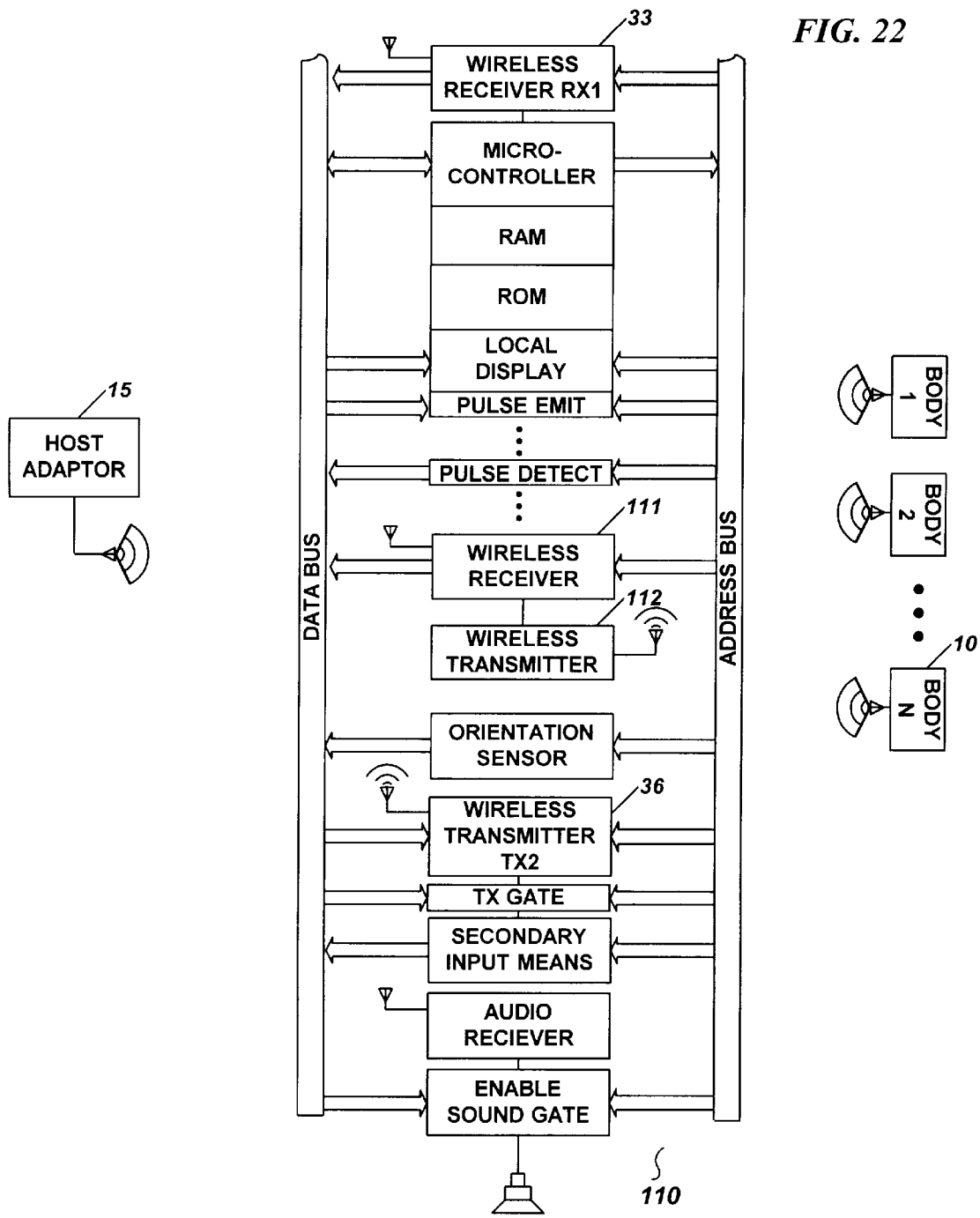
FIG. 22 is a block diagram of a first embodiment signal repeating body.

It must be stated that a control apparatus may use the same or a blended mix of wireless communication operating frequencies to maximize the operable distance between the host adapter and the set of user manipulated bodies. Since it is presently known that RF can be used to transmit over virtually any distance and through household walls a control apparatus may use RF to communicate with a 'signal repeating body' which may function to bridge long distance RF communication from the host adapter to a localized group of user manipulated bodies operating at a wireless communication frequency other than RF. A signal repeating body may be externally indistinguishable from any member in the set of user manipulated bodies 10. A complete configuration is shown in FIG. 22. All shared components of both a signal repeating body 110 and a user manipulated body 10 are shown without duplicated reference numbers, with the exception of wireless transmitter 36 and receiver 33 which will be discussed below.

The signal repeating body is equipped with wireless transmitter 112 and wireless receiver 111. It may accept RF signals from the host adapter through wireless receiver 111 and simultaneously transmit the same signal through transmitter 36 which is wired directly to the output of wireless receiver 111 and is capable of operating at the designated wireless communication frequency as used in each body wireless transmitter 36 and receiver 33. The signal repeating body may receive location telemetry from the set of bodies through wireless receiver 33 and pass the received data back to the host adapter using wireless transmitter 112 with previously stated or any transmission protocol.

Supplementary Input Means

It must be stated that the control apparatus may further incorporate additional input means other than body position and orientation tracking to provide the training system with additional input stimuli. Secondary user input 44 may be configured on a signal repeating or on a user manipulated body. Secondary user input may be a keyboard means connected to microcontroller 32 comprising a keyboard at least one key or it may be a microphone/amplifier combination configured to interrupt the body's microcontroller upon the user's touch. For the latter, the user may provide specific input sequences generated by his orderly tapping on the body. The body microcontroller can be programmed to scan for particular pre-defined user generated pulse sequences and generate definitive user input signal upon recognition thereof. All secondary user input signals may be transmitted from each body during specific, periodic, and non conflicting time intervals or it may be appended to the body's position matrix table and transmitted to the host adapter or respectively to the signal repeating body upon receipt of a prompting control signal received therefrom.

The output of secondary user input 44 may also be wired through controlled gate 45 to wireless transmitter 36 such that upon receiving a certain level of auditory input from a microphone/amplifier acting as secondary user input 44 engages gate 45 enabling the passthrough of audio to wireless transmitter 36, FIG. 9. Wireless transmitter 36 broadcasts the active modulated microphone signal to the host adapter or respectively to the signal repeating body. The activation of passthrough gate 45 is triggered by microcontroller 33 upon its interruption due to high output from secondary user input 44. Upon receipt of the first interrupting pulse to host adapter wireless receiver 20 the host adapter receive function would require necessary modification to enable it to distinguish between pulse data and modulated audio. This could be accomplished by post examination of a received transmission specifically testing to see if equal and fixed length high/low pulse duration's are present indicating that a data pulse train has been transmitted, whereas variable duration high/lows indicate modulated audio.

One Detailed Schematic

FIG. 22 shows one schematic of a first embodiment user manipulated body 10. This diagram, and all schematic diagrams incorporated herein assume that each component receives the proper operating voltage as recommended by the manufacturer and as one normally skilled in the art would be knowledgeable of applying. Though the wireless communication operating frequency used in the detail schematic uses RF as an operating frequency as previously stated it is possible to use lightwave or ultrasonic soundwave for achieving the same results. Note, the secondary input means and the orientation sensing options are not shown.

Microcontroller 32 is driven by a colorburst crystal oscillator referenced as the {system clock}, i/o lines A0–A4 provide device addressing through a 3–8 multiplexer 60 to radio transmitter 36, radio receiver 33, video output 37, and the array of photodetectors 38 and light emitters 40.

The microcontroller is interrupted by RB0 which is the output of radio receiver 33. Radio receiver 33 is comprised of RF amplifier 61 tuned to 150 mhz, detector 62, and signal amplifier 63. A ferrite stick antenna similar to those used in AM radios is used to pick up signals from the host adapter. The first bit of the data burst from radio receiver 33 is used to interrupt microcontroller 32, causing the {master} interrupt routine to be engaged.

Data is transmitted to the host adapter though radio transmitter 36. The two inputs to gate 64 are device select from multiplexer 60, and data from the data bus 47. The output of gate 64 is valid data which gates the system clock through gate 65. This modulated system clock is applied to frequency multiplier 66 and frequency multiplier 67, the combination multiplication yields a total of 42 to bring the output frequency to approximately 150 mhz. A ferrite stick antenna similar to those used in AM radios may be used to radiate the signal to the host adapter.

The device receives audio through the audio channel which is comprised of tuned RF amplifier 68, detector 69 and gated audio amplifier 70. The output of audio amplifier 70 can be inhibited by the output of latch 42 in response setting from gate 71 which is set by the audio passthrough settings received from the host adapter.

Emitting a pulse of light from each light emitter is accomplished by logically ANDing the address from the device select mutiplexer 60 on address bus 46 and data from the data bus 47 in gate 72. The output of gate 72 is sent to a one transistor amplifier, the output of which drives the light emitter.

Detecting a pulse of light is accomplished by light detector/amplifier combination 38, the output of which is logically ANDed with the device select from mutiplexer 60. The output of gate 74 is read by the data bus 47.

Figure 23:
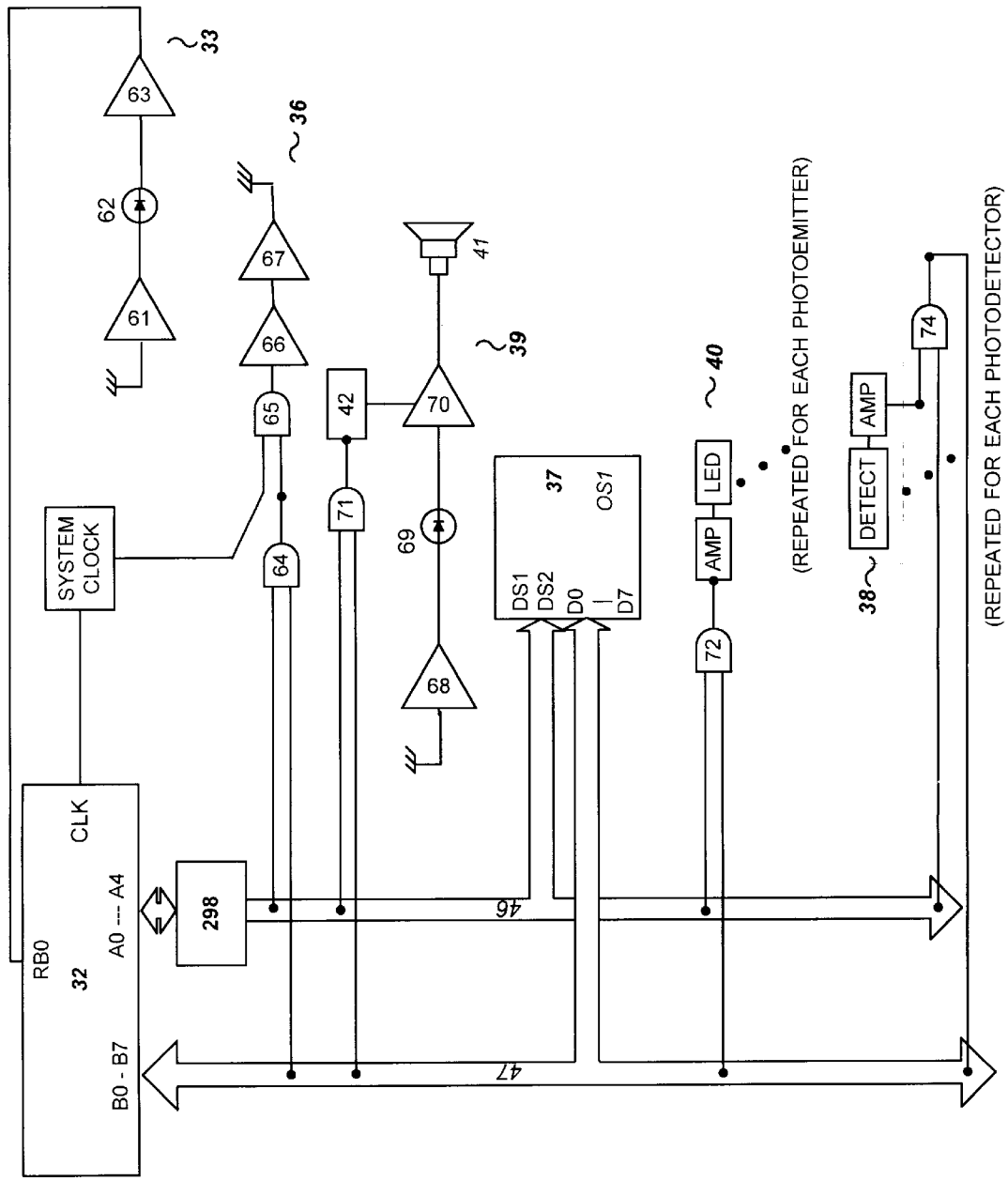
FIG. 23 is one example schematic of a first embodiment user manipulated body.

With reference to FIG. 23, video output 37 is comprised of 8-bit latch 80, 8-bit latch 81, 16 transistors (8 driving rows and 8 driving columns), and an 8 by 8 led matrix (such as the LJ2341-11 available from the FEMA Electronics Corporation of East Brunswick, N.J.). Latches 80 and 81 hold column and row data respectively. Data from the data bus 47 is clocked into these latches by device select lines DS1 and DS2 from multiplexter 60.

With the same reference to FIG. 23, the upper left hand led, for example, will be turned on if Q0 from latch 80 is low which turns on Q9 and output Q7 from latch 81 is high which turns on Q1. The display is strobed sequentially one row at a time at a rate high enough to avoid flicker, such as 1 kh i.e. the entire display is updated in 1 msec.

Figure 24:
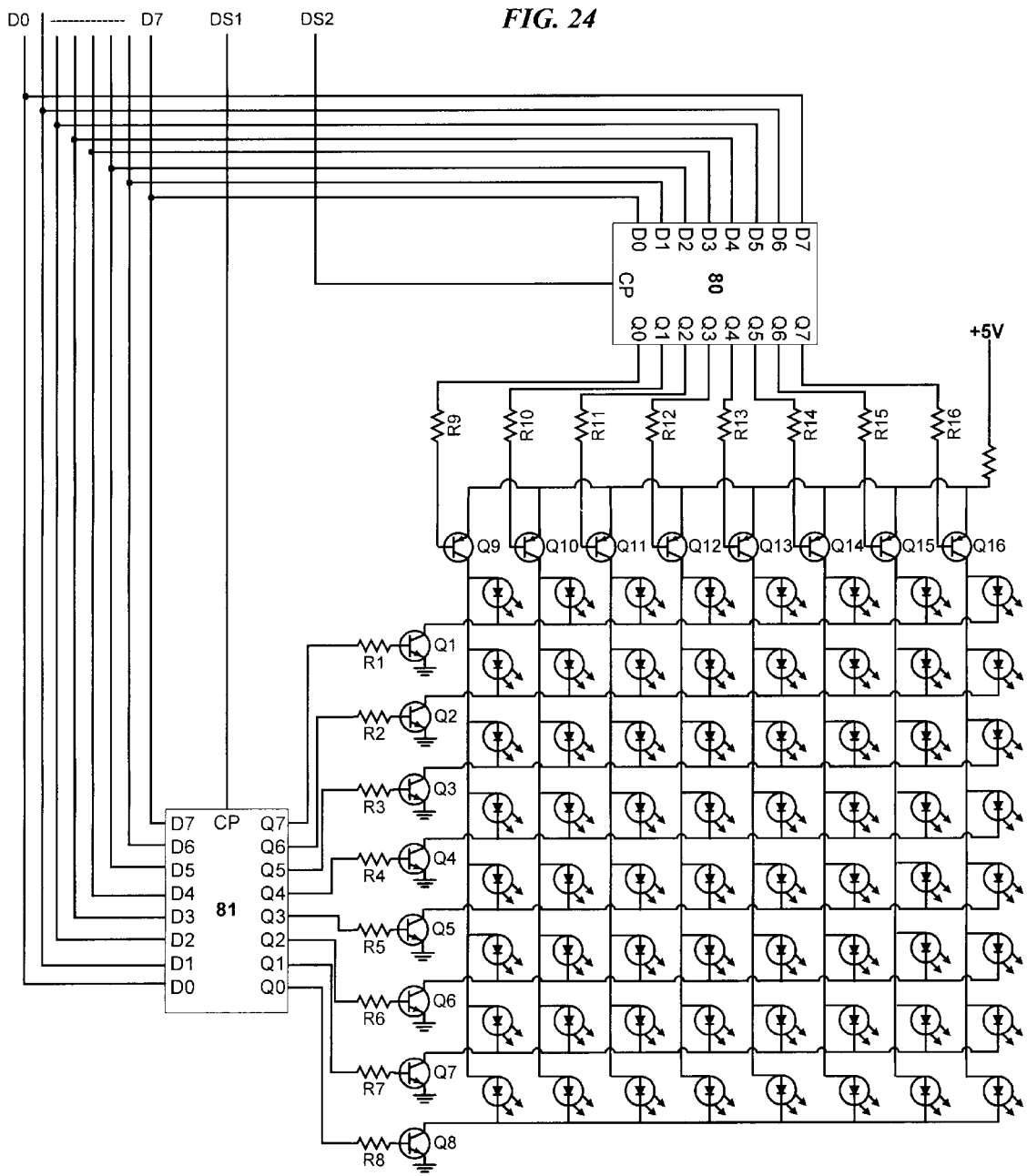
FIG. 24 is a continuation of the schematic of FIG. 22 detailing one video output display subsystem.

Now with reference to the host adapter of FIG. 24, audio is received in the host adapter through connector J1 and is routed through controlled gate 42 to the audio output J3. Gate 22 is set by control pin A3 and loaded by an edge trigger from control pin A4. J1 is also routed to radio transmitter 21 for wireless broadcast.

Radio transmitter 21 has an output frequency of approximately 108 mhz set by the adjustment of coil 85 and the values of capacitors 86 and 87. The audio from J1 is applied to the base of transistor 88, causing the oscillator frequency to vary accordingly resulting in elementary frequency modulation at 108 mhz.

The host adapter receives input through data input pin 12 of connector J2 to microcontroller 16 through control pin A0. Data is output from the microcontroller through control pin A1 to pin 13 of connector J2. Control pin A1 is connected to pin 14 of J2 for setting the {data ready} status for communication control with device driver 3.

Microcontroller 16 is driven by a colorburst crystal oscillator referenced as {system clock} and is interrupted by a high from radio receiver 20 through interrupt control pin RB0 which is the output of radio receiver 20. Radio receiver 20 is comprised of RF amplifier 90 tuned to 150 mhz, detector 91, and signal amplifier 92.

Data is output from microcontroller 16 through radio transmitter 19. Data from control pin A5 is gated through gate 93 with the {system clock}. Applying the modulated {system clock} to frequency multiplier 94 and frequency multiplier 95, the combination multiplication yields a total of 42 to bring the output frequency to approximately 150 mhz. A ferrite stick antenna similar to those used in AM radios may be used to radiate the signal to the host adapter.

It must be stated with regard to the communication subsystem that, although the schematical description herein uses two channels each to communicate modulated audio and pulse data, these may can be combined into one which simultaneously carries modulated audio and pulse data. For RF the pulse data can be transmitted along the sidebands of the modulated audio transmission. For all other frequencies (including RF) the sender may multiplex data bits into the stream of audio such that the receiver could identify and decode the bits from the audio. This could be accomplish by padding each data bit with a preceding and succeeding NULL such that the duration of each the preceding NULL, the data, and the succeeding NULL are precisely fixed such that the receiving microcontroller can identify and filter the data from the modulated audio. Another method would be to broadcast the audio and the pulse data on one channel though not simultaneously. In this case the enable sound gate 42 would also act as an switch enabling and disabling audio during data transmission.

OTHER PREFERRED EMBODIMENTS

The second preferred embodiment differs from the first embodiment in that ultrasonic triangulation is used instead of infrared sensing for tracking bodily location. The change in tracking method enables the independent tracking of each body as opposed to tracking bodily location on a clustered relative and neighboring basis. Furthermore, with multiple sonic emitters and detectors the use of the mechanical orientation is no longer required since both pitch, yall and roll, velocity and acceleration can be computed within a triangulation series. However except as where stated below all characteristics and functions of the first preferred embodiment are incorporated herein.

Figure 25:
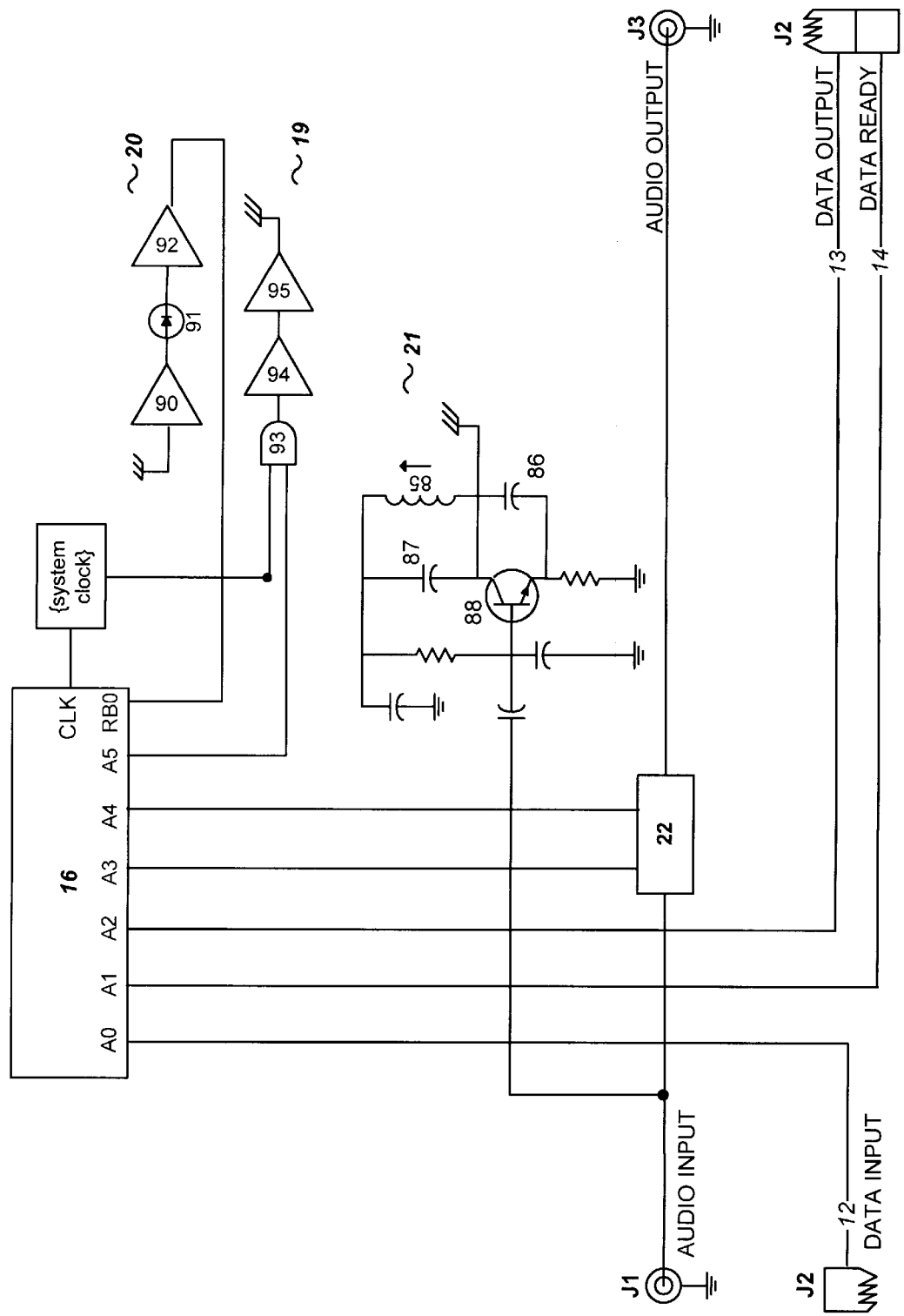
FIG. 25 is one schematic of a first embodiment host adapter using RF as communications frequency.

FIG. 25 shows the second preferred embodiment control apparatus including on each trackable user manipulated body 10 a sonic emitter 100, sonic detector 101, and wave shaper 102. The sonic emitter may be connected to the output of wave shaper 102 which may be addressed independent of detector 101 on the address bus. The series of infrared emitter/detectors attached to the trackable faces of the body are functionally replaced with the ultrasonic means. Sonic emitter 100 may be any transducer capable of operating at frequencies around 40–50 khz above the human audible level. The Murata MA40S3S may be used for this purpose. Detector 101 may be any microphone capable of operating at the same frequency, the Murata MA40S3R may be used as an appropriate pair to the MA40S3S, as both resonate without distortion at ultrasonic frequencies.

The body {process_location} function is altered so that the referenced "trigger" body emits a 40 hz pulse for 0.5 to 2 milliseconds in length. The function is also modified such that each non-trigger body to initiate a continuous count upon engaging in a tracking sequence. The counting process continues while the non-trigger body simultaneously pulls for a signal from the detector microphone 100 upon which the count is terminated. The count delay is directly proportional to the radial distance between the exclusive "trigger" transmitter and the receiver. This count may replace the detect status bits in the body's position matrix table and be transmitted back to the host adapter through time sequencing or through a prompted transmission.

Figure 26:
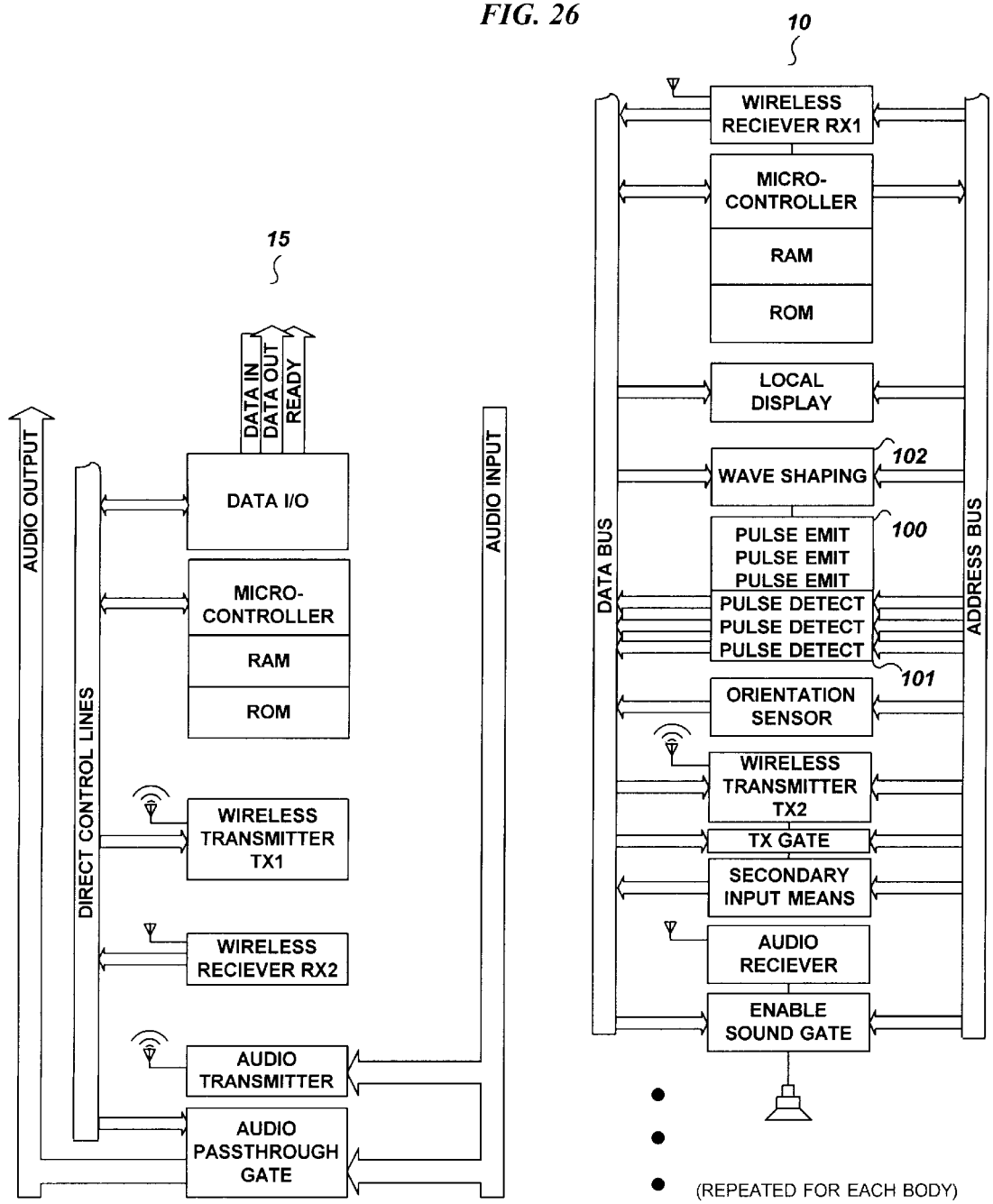
FIG. 26 is a block diagram showing the second embodiment of the control apparatus.

FIG. 26 shows a trigger body and the radiation of output read by all non-trigger bodies prompting termination of each count iteration. FIG. 27 shows the conversion of a digital square wave from microcontroller 32 into a smooth function for driving the ultrasonic transmitter; wave shaper 102. Distance measurements can be duplicated if using the stated preferred tracking method since each non-trigger body would record the delay from itself to the trigger body while each body is once designated as the said trigger. Such duplicate measurements can be smoothed by averaging their values to provide increased tracking accuracy. Assuming a control system using nine bodies, a pulse duration of 1 millisecond, a frequency of measurement of 30 times per second, the respective spatial resolution of the tracking of each body can be better than ½". The relationship holds that tracking resolution of the control apparatus increases as the number of bodies increase, since a multitude of triangulation bases exist for performing the position triangulation of any body. Triangulation of each body positioning may be performed by the host adapter microcontroller or by the controlled computer CPU 7 using standard trigonometric functions.

Additional ultrasonic transmitters may be added to each body at specific inertial reference points to form a relative base for the absolute triangulation of bodily spatial orientation, FIG. 27. This configuration requires modifying the tracking sequencing routines (update_location) to allow for emission and detection of three sequential sonic pulses, opposed to one. The position matrix table would also have to be widened to store the additional timing data. The two additional ultrasonic transmitters may be alternately replaced by two additional ultrasonic detector microphones each also located at specific inertial reference points to form a relative base for triangulation.

Figure 28:
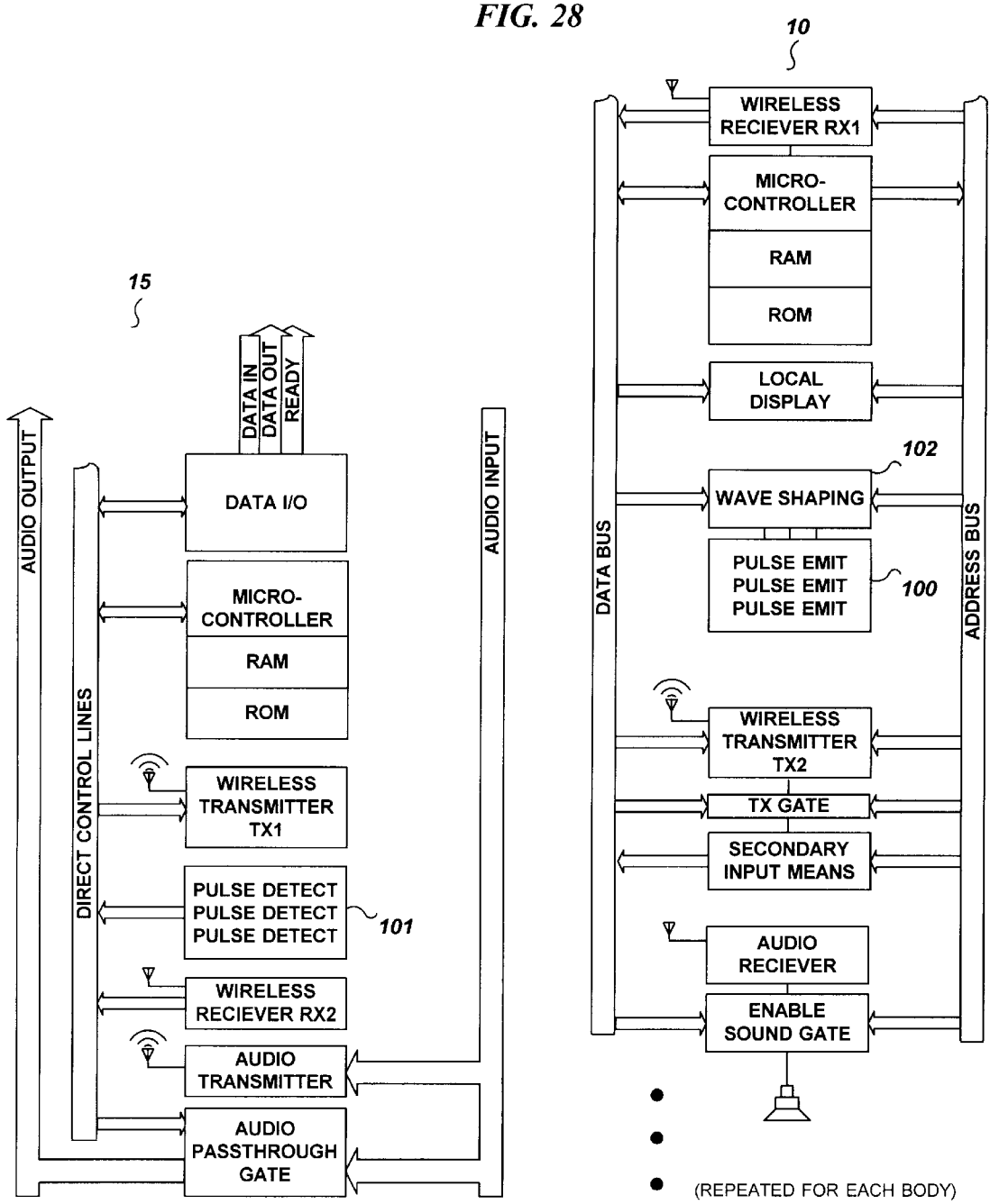
FIG. 28 is a block diagram showing the third embodiment of the control apparatus.
Figure 29:
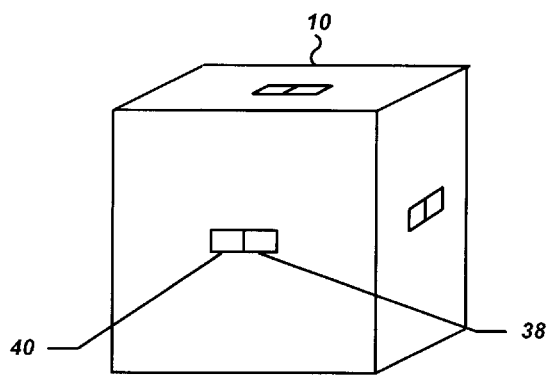
FIG. 29 shows a first embodiment cubic-polygon-shaped body with tracking photonic emitter and detector pairs attached to each body face.
Figure 30A:
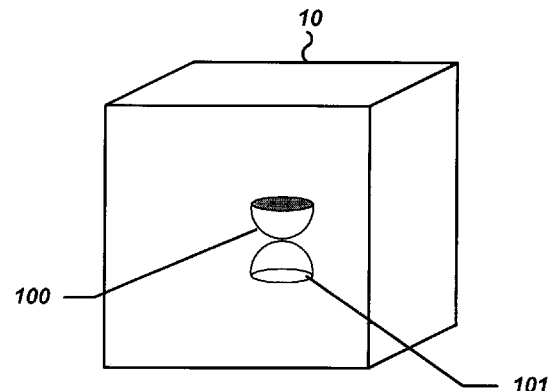
FIG. 30a shows a second embodiment cubic-polygon-shaped body with a ultrasonic emitter and detector.
Figure 30B:
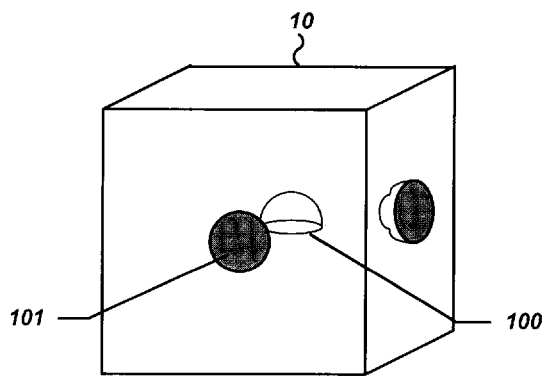
FIG. 30b shows a second embodiment cubic-polygon-shaped body with three ultrasonic detectors.
Figure 30C:
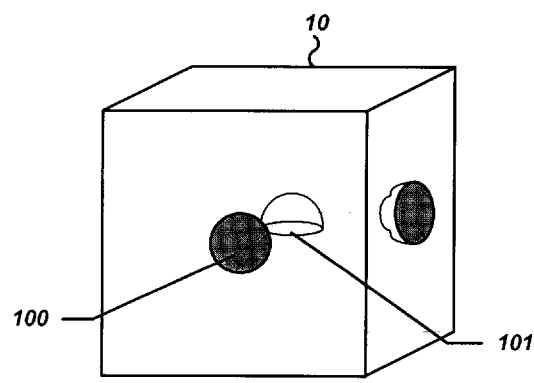
FIG. 30c shows a second embodiment cubic-polygon-shaped body with three ultrasonic emitters.
Figure 31A:
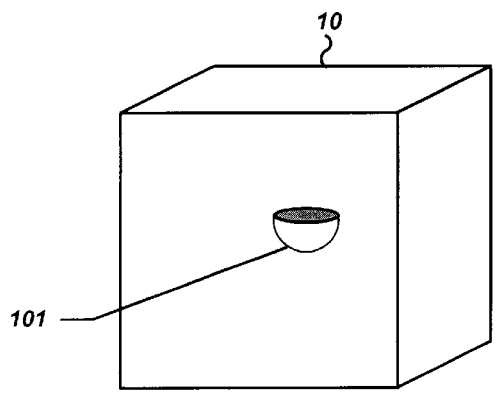
FIG. 31a shows a second embodiment cubic-polygon-shaped body with one ultrasonic emitter.
Figure 31B:
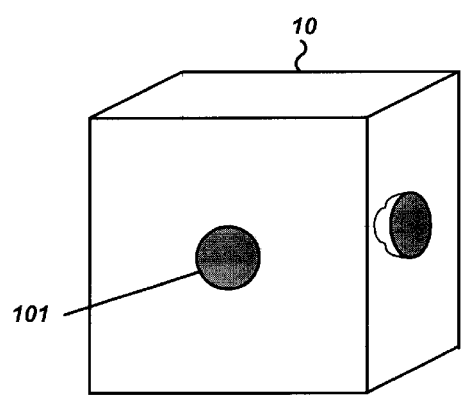
FIG. 31b shows a third embodiment cubic-polygon-shaped body with three ultrasonic emitters.
Figure 31C:
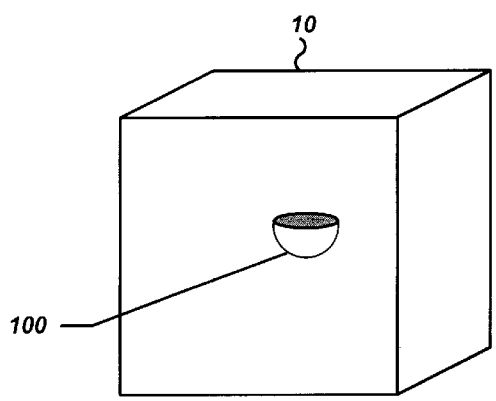
FIG. 31c shows a second embodiment cubic-polygon-shaped body with one ultrasonic detector.
Figure 31D:
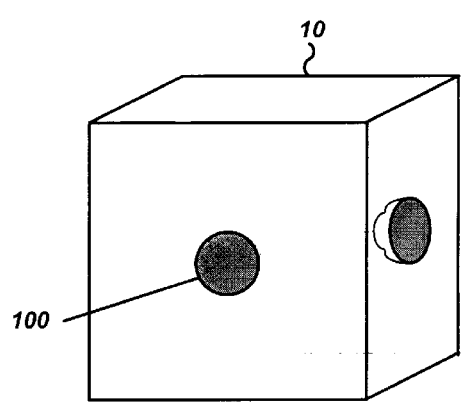
FIG. 31d shows a third embodiment cubic-polygon-shaped body with three ultrasonic detectors.

In the third embodiment each body location and orientation is determined using ultrasonic triangulation between three ultrasonic receiving microphones 101 placed on the host adapter at specific inertial reference points to form a relative base for triangulation. Alternately the microphones may be placed on the signal repeating body. Each trackable body may have one or three ultrasonic transmitters placed at the specific inertial points to form either a single reference point or a referenced secondary triangulation base. FIG. 28 shows the latter configuration. In this embodiment the host adapter or signal repeating body would be required to track the tiring delay of a prompted pulse to its reception. This would require simplifying the process_location routine to support only for the pulse sonic emission from the trigger body upon receiving a trigger request. The need for each body detecting the pulse duration would no longer be needed since this would be supported at the host adapter level. The body {update_location} function would also be simplified as no tracking data is required to be stored or transmitted from any user manipulated body. In this embodiment the bodies may be alternately be configured as pulse receivers receiving pulses dispatched from a host adapter with referentially spaced sending transducers. This would achieve the same results and require similar stated modifications to the tracking functions.

Finally, with regard to all three embodiments and respectively with regard to body tracking and wireless communication it is now stated that the bodily position tracking sensors i.e. the photonic emitter/detector pair in the first embodiment, and the ultrasonic transducer/microphone pair for the other embodiments may each, in addition to tracking be used for sustaining the wireless communications link with the host adapter or respectively with the master body 110. For instance, existing body tracking photonic emitters 40 may be used to communicate tracking or secondary input data to the host adapter or respectively to the signal repeating body 110. Existing body tracking photodetectors 38 may also be used as lightwave receivers for receiving data or combined/multiplexed audio and data. The cited digital communication functions would require simple modification so that each outgoing data pulse is sent to each photoemitter 40 while incoming pulse trains are read from each photodetector 38. For ultrasonic tracking configurations the host adapter or master body 110 respective wireless transmitter would operate at the ultrasonic frequency and comprise a sonic emitter similar or identical to the sonic emitter used in the body position tracking sonic detector 100. It would transmit data or multiplexed audio/data signals to each body sonic detector microphone 101 which would also be used for position tracking. Body tracking sonic emitter 100 would be the same device as wireless transmitter 36 and used for both tracking as well as for transmitting pulse data to host adapter wireless receiver 20 which would also be a similar or identical-type of microphone as used in the body's sonic detector 101.

SUMMARY, RAMIFICATIONS, AND SCOPE

Although the description above contains many specificity's, these should not be construed as limiting the scope of the invention but as merely providing illustrations of some of the presently preferred embodiments. For example the schematic used herein assumes radio frequency as the operating pulse frequency for wireless data and audio transmission and reception when other said operating frequencies may be used. Also, the transmission protocols used to transmit data between the user manipulated bodies and the host adapter may also be used to send data between the bodies, the user-movable bodies in the control apparatus may have photonic sensors on select faces or all faces including the face holding the display means, multiple display means may be attached to one body, the LED display may be replaced with a plastic overlay, or an LCD, the bodies may have other shapes, etc. Finally, the description herein describes a plurality of body options and configurations including orientation sensing, active/passive display, secondary input means, etc. It need be stated that various configurations of the above discussed options and the directed feedback method of instruction for use with the same are hereby incorporated as "the present invention".

Thus, the scope of the present invention should be determined by the appended claims and their legal equivalents, rather than by the examples given.

I claim:

1. A method for tracking the relative position clustering of a plurality of user manipulated wireless bodies, comprising the steps of:
    (a) providing at least two user manipulated bodies each having a photonic emitter and a photonic detector attached such that a photonic pulse emitted by one body can be detected by another body in apposition thereto,
    (b) selecting one exclusive body previously non-selected from the plurality of user manipulated wireless bodies,
    (c) emitting a pulse of light from all tracked faces of the body selected in (a), while simultaneously recording, in a table stored in each body and indexed by the selected exclusive body, the photonic detect status of each body photonic detector,
    (d) repeating step (b) until all bodies have been selected at least once.

2. The method of claim 1, wherein each body is provided a wireless transmitter, and further comprises transmitting the stored table from each body to a receiving means connected to the controlled computer.

3. The method of claim 2, further comprising the steps of:
    (e) clearing the select or non-select status of all of the bodies,
    (f) repeating steps (a)–(e); whereby the real-time relative position clustering of the objects is enabled.

4. The method of claim 2 wherein the user manipulated bodies are capable of producing audio output and the recorded media feedback created in (d) is strategically segmented into frames each of which are output through one or more bodies.

5. The method of claim 4 wherein user feedback associated with a lesson is dynamically produced by a speech synthesizer.

6. The method of claim 4 wherein learning constructs are characters, lessons are words stored in an electronic dictionary, and user feedback associated with each lesson is dynamically produced by a speech synthesizer.

7. A method for tracking relative position clustering of a plurality of user manipulated wireless bodies, comprising the steps of:
    (a) providing at least two user manipulated bodies each having an ultrasonic emitter and an ultrasonic detector,
    (b) selecting one exclusive body previously non-selected from the plurality of user manipulated wireless bodies,
    (c) emitting an ultrasonic pulse from the body selected in (b), while simultaneously recording, in a table stored in each body and indexed by the selected exclusive body, the time duration resulting from the delay in which the transmitted pulse is detected by each body ultrasonic detector,
    (d) repeating steps (b)–(c) until all objects have been selected at least once.

8. The method of claim 7, wherein each body is provided a wireless transmitter, and further comprises transmitting the stored table from each body to a receiving means connected to the controlled computer.

9. The method of claim 8, further comprising the steps of:
    (e) clearing the select or non-select status of all of the bodies,
    (f) repeating steps (a)–(e); whereby real-time relative position clustering of the objects is enabled.

10. The method of claim 8 wherein the user manipulated bodies are capable of producing audio output and the recorded media feedback created in (d) is strategically segmented into frames each of which are output through one or more bodies.

11. The method of claim 8 wherein user feedback associated with each lesson is dynamically produced by a speech synthesizer.

12. The method of claim 8 wherein learning constructs are characters, lessons are words stored in an electronic dictionary, and user feedback associated with each lesson is dynamically produced by a speech synthesizer.

13. An automated method for direct feedback instruction of a student, comprising the steps of:

(a) identifying a set of learning constructs which will be manipulated by the student, (b) identifying a plurality of lessons which may be taught to the student based upon a physical arrangement of the learning constructs of (a), (c) storing spatial arrangement rules describing the arrangement forming each lesson identified in (b), (d) for each identified lesson of (b), creating and storing media providing user feedback to the student, (e) providing for each learning construct of (a), at least one user manipulated body which is associated to, and conveying of, the learning construct as identified in (a), (f) tracking physical positioning coordinates of each user manipulated body of (e), (g) determining if the student has arranged a lesson, by comparing said tracked coordinates of (f) with the said stored spatial arrangement rules of (c).

(h) providing said user feedback as created in (d) for each arranged lesson as determined in (g).

14. The method of claim 13 wherein the user manipulated bodies are capable of producing audio output and the recorded media feedback created in (d) is strategically segmented into frames each of which are output through one or more bodies.

15. The method of claim 14 wherein the user feedback associated with each lesson is dynamically produced by a speech synthesizer.

16. The method of claim 14 wherein the learning constructs are characters, the lessons are words stored in an electronic dictionary, and the user feedback associated with each lesson is dynamically produced by a speech synthesizer.

17. An interface apparatus for control of a computer comprising:

at least two user manipulated bodies each comprising a tracking means generating tracking signals in response to user-manipulation of each said body, a control means connected to said tracking means receiving said tracking signals and controllably coupling the same into a form suitable for transmission, a wireless transmission means having input means for receiving said coupled tracking signals from said control means and generating transmission radiation output in response thereto, a host adapter connected to the controlled computer comprising a wireless receiving means receiving said transmission radiation from at least one of said bodies and generating pulse output signals in response thereto; said controlled computer having input means for receiving said pulse output signals from said wireless receiving means; whereby the signals enable the controlled computer to determine the position of each body relative to the other bodies.

18. The interface apparatus of claim 17 wherein each body tracking means also functions as each body wireless transmission means.

19. The interface apparatus of claim 17 further comprising a host adapter wireless transmission means having input receiving audio from a sound generating device and generating output radiation in response thereto, a wireless receiving body comprised of a receiving means receiving said output radiation and generating audio signals in response thereto, a audio amplifier amplifying said audio signals to a suitable output level, and a speaker connected to said audio amplifier enabling remote audio feedback.

20. The interface apparatus of claim 17 wherein each body further comprises a display containing visual constructs.

21. The interface apparatus of claim 17 further comprising a host adapter wireless transmission means having input receiving encoded visual feedback from said controlled computer and generating radiation in response thereto, and a wireless receiving body comprised of a receiving means, a control means, and a display means; said receiving body receiving said radiation from said host transmission means and generating display signals in response thereto, and, controllably coupling the said display signals into said display means enabling remote video feedback.

22. The interface apparatus of claim 17 further comprising a host adapter wireless transmission means having input receiving encoded visual feedback from said controlled computer and generating radiation in response thereto, a receiving means and display means both connected to at least one said body; said at least one body receiving said visual feedback radiation, generating display signals in response thereto, and controllably same into said display enabling direct remote video feedback.

23. The interface apparatus of claim 17 wherein each body further comprising a wireless receiving means having input receiving radiation emitted from other said bodies and generating output signals in response thereto, each said body control means also controllably coupling said output signals from said body receiving means into said body wireless transmission means; each said body tracking means being comprised of at least one infrared transceiver and also functioning as each said body receiving and as each said body transmission means; whereby each body performs signal repeating functions along the same frequency to increase communication stability and range.

24. The interface apparatus of claim 17 further comprising a host adapter control and storage means; said host control means being connected to said host receiving means and controllably coupling said receiving means output into and out of said storage means enabling temporary storage thereof, whereby the tracking signals may be batch transferred from the host adapter to the controlled computer.

25. The interface apparatus of claim 17 where in each body further comprising a storage means connected to the said body control means enabling temporary storage of pulse data; each said body control means also for loading said pulse data into and out of said body storage means; whereby tracking data may pend enabling the batch transfer thereof to the host adapter.

26. The interface apparatus of claim 17 wherein said interface apparatus being used for a purpose which is selected from the group consisting of supporting computer-aided educational activities, supporting entertainment activities, and supporting research activities.

27. The interface apparatus of claim 17 wherein the said transmission radiation is echoed to the host adapter through at least one signal repeating body comprising a receiving means having input receiving transmission radiation emitted from at least one said user manipulated body and generating output signals in response thereto, and, a transmission means having input connected to said signal repeating receiving means and generating output radiation in response thereto;

whereby the repeating body is not location tracked though functions to provide blended communication transmission in environments where a direct line of sight from the bodies to the host is unavailable due to household walls or for successful operation in operating environments where occluding objects would normally stymie the communication integrity between a body and the host adapter.

28. The interface apparatus of claim 18 wherein each said body tracking means is comprised of at least one infrared transceiver.

29. The interface apparatus of claim 19 where in said receiving body further comprising a display means and a control means; said host adapter transmission means also having input receiving encoded visual feedback from said controlled computer and generating radiation in response thereto, said receiving body receiving said display radiation and generating display signals in response thereto and controllably coupling said display signals into said display means; whereby remote audio and video feedback is enabled.

30. The interface device of claim 19 further comprising a gate connected to the said sound generating device providing controlled passthrough of audio to optional external speakers.

31. The interface device of claim 22 wherein the host adapter is also transmitting and at least one body receiving audio feedback; all said user manipulated bodies further comprising a display, amplifier, and speaker; whereby remote audio video direct feedback is enabled.

32. The interface apparatus of claim 25 wherein each said body storage means also storing an event scheduling table defining a plurality of body control tasks, each said body control means referencing said scheduling table and performing said control tasks in the sequence in which each task is designated as defined.

33. The interface apparatus of claim 27 wherein the signal repeating body is one of said at least two user manipulated bodies and is location tracked.

34. The interface apparatus of claim 32 further comprising an orientation sensing means connected to at least one said body control means generating signals used to determine the body orientation, said at least one body control means also for controllably coupling said orientation signals into pulse data, for loading and unloading the pulse data into and out of the said body storage means, and for controllably coupling the pulse data into the said at least one body wireless transmission means for wireless transmission thereof.

35. The interface apparatus of claim 32 further comprising a secondary user input means connected to the control means of at least one body and generating secondary input signals in response to the user manipulation thereof, said body control means also receiving and controllably coupling said secondary input signals into pulse data, controllably coupling the pulse data into the said at least one body storage means, and controllably coupling the stored pulse data into the transmission means, said host adapter receiving means also receiving said secondary input radiation and generating encoded pulse signals in response thereto.

36. The interface apparatus of claim 32 wherein the host adapter is also the said controlled computer and further comprises a control means and a fixed or removable storage means.

37. The interface apparatus of claim 32 wherein each said body transmission means and host adapter receiving means are, respectively, devices selected from the group consisting of a radio transmitter and a radio receiver, a sonic emitter and a sonic detector, a ultrasonic emitter and a ultrasonic detector, a photonic emitter and a photonic detector.

38. The interface apparatus of claim 32 wherein each said body tracking means having a pulse emitter and a pulse detector; said pulse emitter generating pulse radiation in response to trigger pulses received from each said body control means, said pulse detector receiving pulse radiation and generating output signals in response thereto; wherein each said body control means being time synchronized and each said body tracking means being comprised of devices selected from the group consisting of, at least one paired photonic emitter and detector, at least one paired photonic emitter and photoresistor, at least one sonic emitter and at least one sonic detector, and at least one ultrasonic emitter and at least one ultrasonic detector.

39. The interface apparatus of claim 38 wherein at least one paired photonic emitter and detector is selected as each said body tracking means, and each said pair being attached to each body tracked face such that a radiated photonic pulse emitted from one body will be received by another body oriented with a tracked face adjacent and in apposition thereto; whereby the controlled computer receives signals to identify the adjacent clustering of the bodies.

40. The interface apparatus of claim 38 wherein one paired ultrasonic emitter and detector is selected as each said body tracking means.

41. The interface apparatus of claim 38 wherein three ultrasonic emitters and one ultrasonic detector is selected as each said body tracking means.

42. The interface apparatus of claim 40 wherein an ultrasonic transceiver is used instead of the paired ultrasonic emitter and detector pair.

43. The interface apparatus of claim 40 wherein one ultrasonic emitter and three ultrasonic detectors are used.

44. An interface apparatus for control of a computer comprising:

at least two user manipulated bodies each comprising a tracking means generating tracking signals in response to user manipulation of each said body, a control means connected to said tracking means receiving said tracking signals and controllably coupling the same into a form suitable for transmission, a wireless transmission means for receiving said coupled tracking signals from said body control means and generating transmission tracking radiation in response thereto, a wireless receiving means connected to said body control means for receiving transmission control radiation and generating output control signals in response thereto, and a host adapter connected to the controlled computer comprising a host wireless receiving means receiving said transmission tracking radiation from at least one of said bodies and generating output tracking signals in response thereto, and, a host wireless transmission means having input means for receiving pulse encoded task control signals from said controlled computer and generating transmission control radiation in response thereto; said controlled computer receiving said output tracking signals from said wireless receiving means; whereby the signals passed to the controlled computer are used as an input thereto and for determination of position of each body relative to the other bodies.

45. The interface apparatus of claim 44 wherein each said body tracking means also functioning as each said body receiving and transmission means.

46. The interface apparatus of claim 44 wherein said interface further comprising a display, and said host adapter wireless transmission means also transmitting encoded visual feedback.

47. The interface apparatus of claim 44 wherein said host adapter transmission means also transmitting encoded visual feedback; at least one said body further comprising a display means; wherein said at least one body receiving means also receiving said display radiation and generating display signals in response thereto, said at least one body control means also controllably coupling said display signals into the display means.

48. The interface apparatus of claim 44 wherein said host adapter transmission means also transmitting audio feedback and said interface further comprising an audio amplifier and a speaker.

49. The interface apparatus of claim 44 further comprising a host control and storage means; said host control means being connected to said host receiving means and controllably coupling said tracking output signals into the storage means enabling temporary storage thereof, said controlled computer receiving said stored output signals from the said control means; whereby tracking data may be batch transferred to the controlled computer.

50. The interface apparatus of claim 44 wherein each body receiving means receiving said transmission radiation from other said bodies and from said host adapter and generating output signals in response thereto, said body control means also controllably coupling the output signals from said receiving into said body wireless transmission means; each body tracking means being comprised of at least one infrared transceiver and also functioning as each said body receiving and each said body transmission means; whereby each body acts as a photonic signal repeating body to maximize communication link distance.

51. The interface apparatus of claim 44 wherein each body further comprising a storage means connected to each said control means providing temporary storage of data received by each body.

52. The interface device as in claim 48, further comprising a gated audio output port connected to the output of said sound generating device and to the host adapter control means for providing controlled passthrough of audio to optional external speakers.

53. The interface apparatus of claim 51 wherein each said body tracking means being comprised of devices selected from the group consisting of, at least one photonic emitter and detector, at least one photonic emitter and photoresistor, at least one ultrasonic emitter and detector.

54. The interface apparatus of claim 51 wherein at least one body further comprising a display connected to the said at least one body control means.

55. The interface apparatus of claim 51 wherein at least one body further comprising an audio amplifier and speaker; said host broadcasting encoded audio and audio control signals, said at least one body receiving, decoding, storing, and emitting audio in response to said audio control signals broadcast by host.

56. The interface apparatus of claim 51 further comprising an orientation sensing means connected to at least one body control means generating signals used to determine the body orientation.

57. The interface apparatus of claim 51 wherein at least one body further comprising a secondary user input means connected to the body control means and generating signals in response to the user manipulation thereof, said body control means also receiving and controllably coupling said input signals into pulse data, controllably coupling the pulse data into said body storage means, and controllably coupling the stored pulse data into the transmission means for broadcast to the host adapter, said host adapter wireless receiving means also receiving said radiation and generating encoded pulse signals representing secondary user input.

58. The interface apparatus of claim 53 wherein at least one paired photonic emitter and detector is selected as each said body tracking means, and each said pair being attached to each body tracked face such that a radiated photonic pulse emitted from one body will be received by another body oriented with a tracked face adjacent and in apposition thereto; whereby the controlled computer receives pulse data from each body identifying the specific bodies being directly adjacent thereto.

59. The interface apparatus of claim 53 wherein one paired ultrasonic emitter and detector is selected as each said body tracking means; each said body control means also calculating and storing time delay between a regulated triggered pulse and the receipt thereof in said detector, said time delay being transmitted to the host adapter and being proportional to the distance between the trigger pulse emitting body and each respective receiving body; whereby the controlled computer may receive from each body the effective distance between itself and each other body.

60. The interface apparatus of claim 53 wherein three ultrasonic emitters and one ultrasonic detector is selected as each said body tracking means.

61. The interface apparatus of claim 53 wherein each said body tracking pulse emitter is also used as said body wireless transmission means.

62. The interface apparatus of claim 53 wherein each said body tracking pulse detector is also used as said body wireless receiving means.

63. The interface apparatus of claim 54 wherein each body having a display and said host adapter also broadcasting video feedback.

64. The interface apparatus of claim 55 further including in said at least one body a gate which controls the on/off setting of said at least one body speaker.

65. The interface device as in claim 55, further comprising an audio passthrough gate providing controlled passthrough of audio to optional external speakers.

66. The interface device as in claim 56, wherein said orientation sensing means generates signals used to identify the pitch and roll of any polygon and comprises an electrical pathway associated with each polygon face and an electrically conductive object enclosed in a hollowed spherical chamber, said chamber unioned with one or more elongated concave cavities aligned at referential points of perpendicularly to each face of the underlying polygon, said chamber being made of non-conductive material and having a hole positioned at each of the cavity's cusp, each said hole aligned parallel and concentric to a unique face of the underlying polygon, each said electrical pathway leading from a power source through the corresponding parallel hole to said body control means, said conductive object sealed inside the chamber being free to roll into and out of said cavities such that an open gate is formed when the object rolls into a cavity, said body control means also reading the status of each pathway to determine the pitch and roll of said body.

67. The interface of claim 58, wherein at least one body further comprising a display means attached thereto; said display means being user removable and comprising an overlay having an encoded id inscribed on its undersurface positioned directly in apposition to the body surface such that said photonic detector can read the high/low status of an individual bit encoding the overlay id upon emitting a pulse of light from said photonic emitter, said overlay id also enabling light to be passed through for maintaining body tracking functionality; said body control means reading, encoding, and coupling the overlay id into said body transmission means for broadcast to said host adapter.

68. The interface apparatus of claim 59 wherein one emitter and three detectors are used.

69. An interface apparatus for control of a computer comprising:
at least two user manipulated bodies each comprising a tracking means generating tracking signals in response to user manipulation and relative positioning of each said body, a control means connected to said tracking means for receiving said tracking signals and controllably coupling the same into pulse data, a storage means receiving said pulse data from said body control means, a wireless transmission means having input means for receiving said pulse data from said body control means and generating pulse radiation in response thereto, a wireless receiving means receiving control radiation and generating output control signals in response thereto, and a host adapter receiving station connected to the controlled computer comprising a host wireless receiving means receiving said pulse radiation from at least one body and generating pulse output signals in response thereto, and a host wireless transmission means having input means for receiving pulse encoded task control signals from said controlled computer and generating pulse radiation in response thereto; said controlled computer receiving said pulse output signals from said wireless receiving means for enabling determination of relative body positioning.

70. The interface of claim 69 wherein each body further comprises a static display containing visual constructs.

71. The interface apparatus of claim 69 wherein each body tracking means being a photonic transceiver and also functioning as each body wireless transmission and receiving means.

72. The interface apparatus of claim 69 wherein said host transmission means also radiating signals encoding audio.

73. The interface apparatus of claim 69 wherein said host transmission means also radiating signals encoding video.

74. The interface apparatus of claim 69 wherein said host transmission means also radiating signals encoding audio and video.

75. The interface apparatus of claim 69 wherein each body receiving means also receives said transmission radiation from other said bodies and from said host adapter and generates output signals in response thereto, each said body control means processing and coupling said output signals into said body wireless transmission means; each body tracking means also functioning as each said body receiving and each said body transmission means; whereby each body scans and repeats signals to maximize communication link distance.

76. The interface of claim 69 wherein a variable number of bodies are used.

77. The interface of claim 72 wherein at least one body further including a speaker and an audio amplifier.

78. The interface apparatus of claim 73 wherein at least one body further comprising a display.

79. The interface apparatus of claim 74, wherein at least one body further including an amplifier, speaker, and a display means; said at least one body display means attached to said at least one body control means enabling the body to output video, said at least one body receiving, decoding, and coupling said audio and video radiation signals into the said amplifier and into the said display means.

80. The interface apparatus of claim 75 further comprising a secondary user input means connected to the control means of at least one of said bodies and generating secondary input signals in response to the user manipulation thereof, said at least one body control means also receiving and controllably coupling said input signals into pulse data, controllably coupling the pulse data into the said body storage means, and controllably coupling the stored pulse data into the transmission means for transmission to said host.

81. The interface of claim 77 wherein each said body further comprising a speaker and an audio amplifier.

82. The interface of claim 78 wherein each said body further comprising a display.

83. The interface apparatus of claim 78 wherein said at least one body storage means storing visual display constructs and said host broadcasting pulse encoded playback signals prompting the body to display said stored visual feedback.

84. The interface of claim 79 wherein each said body further comprising an amplifier, speaker, and a display.

85. The interface apparatus of claim 79 wherein each body receiving means also receives said transmission radiation from other said bodies and from said host adapter and generates output signals in response thereto, each said body control means processing and coupling said output signals into said body wireless transmission means; each body tracking means also functioning as each said body receiving and each said body transmission means; whereby each body scans and repeats signals to maximize communication link distance.

86. The interface apparatus of claim 81 wherein each body further comprising an audio passthrough gate enabling on/off control of each body audio output.

87. The interface apparatus of claim 81 wherein said host adapter also broadcasting audio storage and playback control signals; each said body control means also controllably coupling the said audio into and out of each said body storage means in response to said storage and playback control signals.

88. The interface apparatus of claim 84 wherein each body further comprising an audio passthrough gate enabling on/off control of each body audio output.

89. The interface apparatus of claim 84 wherein said host adapter also broadcasting audio storage and playback control signals; each said body control means also controllably coupling the said audio into and out of each said body storage means and into and out of each said body amplifier in response to said storage and playback control signals.

90. The interface apparatus of claim 84 wherein each said body tracking means being an array of infrared transceivers attached to each said body tracked face such that a radiated photonic pulse emitted from one body will be received by another body oriented with a tracked face adjacent and in apposition thereto.

91. The interface apparatus of claim 84 wherein three ultrasonic emitters and one ultrasonic detector is selected as each said body tracking means; said three ultrasonic emitters being located respectively at inertial reference points in each body for the orientation triangulation determination of each said body, each said body control means also calculating and storing each time delay recorded between a regulated triggered pulse and its receipt thereof in said detector, said delay being proportional to the distance between the sending and receiving body; whereby the controlled computer may receive from each body the effective distance between the body and three reference points on each other body.

* * * * *